United States Patent
Hart et al.

(10) Patent No.: US 7,650,379 B2
(45) Date of Patent: *Jan. 19, 2010

(54) METHOD FOR CHANNEL CONGESTION MANAGEMENT

(75) Inventors: Steven R. Hart, Carlsbad, CA (US);
Mark J. Miller, Vista, CA (US);
Charles N. Pateros, Carlsbad, CA (US)

(73) Assignee: ViaSat, Inc., Calrsbad, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 11/538,429

(22) Filed: Oct. 3, 2006

(65) Prior Publication Data

US 2007/0110098 A1 May 17, 2007

Related U.S. Application Data

(63) Continuation-in-part of application No. 10/732,671, filed on Dec. 9, 2003, now Pat. No. 7,254,609.

(51) Int. Cl.
*H04J 1/16* (2006.01)
(52) U.S. Cl. ................ 709/203; 709/224; 709/228; 370/230; 370/236
(58) Field of Classification Search ........... 709/203, 709/224, 228, 235; 370/230, 236
See application file for complete search history.

(56) References Cited

U.S. PATENT DOCUMENTS

| | | | |
|---|---|---|---|
| 6,366,761 B1 | 4/2002 | Montpetit | |
| 6,946,950 B1* | 9/2005 | Ueno et al. | 340/10.1 |
| 7,088,678 B1* | 8/2006 | Freed et al. | 370/230 |
| 7,254,609 B2* | 8/2007 | Hart et al. | 709/203 |
| 2002/0161914 A1* | 10/2002 | Belenki | 709/235 |
| 2004/0105403 A1 | 6/2004 | Lin et al. | |
| 2004/0172658 A1 | 9/2004 | Rakib et al. | |
| 2005/0052992 A1* | 3/2005 | Cloonan et al. | 370/229 |
| 2005/0136832 A1 | 6/2005 | Spreizer | |
| 2005/0144306 A1 | 6/2005 | Hart et al. | |
| 2009/0052326 A1* | 2/2009 | Bergamasco et al. | 370/236 |

OTHER PUBLICATIONS

International Search Report PCT/US07/77025.

* cited by examiner

*Primary Examiner*—Khanh Q Dinh
(74) *Attorney, Agent, or Firm*—Townsend and Townsend and Crew LLP; Kenneth R. Allen

(57) ABSTRACT

A method for managing data traffic in a multi-user multiple-simultaneous-access (MUMSA) environment, for example in a code reuse multiple access (CRMA) environment or other physical environment having true random access with more than one transmission present at the same time, the method including estimating channel load for multiple users, then using the estimate of channel load to calculate a congestion threshold on an ongoing basis, at each terminal performing an experiment using that congestion threshold value and a random number generator to determine if a packet is eligible to be transmitted, transferring downstream virtual channel traffic and redistributing user terminals to affiliate with the proper downstream virtual channel.

22 Claims, 30 Drawing Sheets

METHOD FOR CHANNEL CONGESTION MANAGEMENT

CROSS-REFERENCES TO RELATED APPLICATIONS

The present application is a continuation of U.S. application Ser. No. 11/538,249 filed Oct. 3, 2006 which is a continuation-in-part of U.S. application Ser. No. 10/732,671, filed on Dec. 9, 2003, entitled "Method for Channel Congestion Management," now U.S. Pat. No. 7,254,609 issued Aug. 7, 2007, the content of which is incorporated herein by reference in its entirety.

The following U.S. provisional and continuation-in-part patent applications have been filed concurrently and the disclosure of every other application is incorporated by reference in the present application in its entirety for all purposes:

U.S. Provisional Patent Application No. 60/827,924, filed Oct. 3, 2006 for "Adaptive Use of Satellite Uplink Bands" corresponding to U.S. patent application Ser. No. 12/406,861;

U.S. Provisional Patent Application No. 60/827,927, filed Oct. 3, 2006 for "Frequency Re-use for Service and Gateway Beams" corresponding to U.S. patent application Ser. No. 12/406,804;

U.S. Provisional Patent Application No. 60/827,959, filed Oct. 3, 2006 for "Satellite Architecture" corresponding to U.S. patent application Ser. No. 12/406,880;

U.S. Provisional Patent Application No. 60/827,960, filed Oct. 3, 2006 for "Piggy-back Satellite Architecture" corresponding to U.S. patent application Ser. No. 12/406,887;

U.S. Provisional Patent Application No. 60/827,964, filed Oct. 3, 2006 for "Placement of Gateways Away from Service Beams" corresponding to U.S. patent application Ser. No. 12/187,051;

U.S. Provisional Patent Application No. 60/828,021, filed Oct. 3, 2006 for "Multi-Service Provider Subscriber Authentication" corresponding to U.S. patent application Ser. No. 12/406,847;

U.S. Provisional Patent Application No. 60/828,033, filed Oct. 3, 2006 for "Large Packet Concatenation in Satellite Communication System" corresponding to U.S. patent application Ser. No. 12/408,543;

U.S. Provisional Patent Application No. 60/828,037, filed Oct. 3, 2006 for "Upfront Delayed Concatenation In Satellite Communication System" corresponding to U.S. patent application Ser. No. 12/406,900;

U.S. Provisional Patent Application No. 60/828,014, filed Oct. 3, 2006 for "Map-Trigger Dump Of Packets In Satellite Communication System" corresponding to U.S. patent application Ser. No. 12/408,614 for "Map-Triggered Dump Of Packets In Satellite Communication System";

U.S. Provisional Patent Application No. 60/828,044, filed Oct. 3, 2006 for "Web/Bulk Transfer Preallocation Of Upstream Resources In A Satellite Communication System" corresponding to U.S. patent application Ser. No. 12/409,306;

U.S. Continuation in Part patent application Ser. No. 11/538,431, filed Oct. 3, 2006 for "Code Reuse Multiple Access For A Satellite Return Link";

U.S. Provisional Patent Application No. 60/827,985, filed Oct. 3, 2006 for "Aggregate Rate Modem" corresponding to U.S. patent application Ser. No. 12/174,525;

U.S. Provisional Patent Application No. 60/827,988, filed Oct. 3, 2006 for "Packet Reformatting for Downstream Links" corresponding to U.S. patent application Ser. No. 12/174,222;

U.S. Provisional Patent Application No. 60/827,992, filed Oct. 3, 2006 for "Downstream Waveform Modification" corresponding to U.S. patent application Ser. No. 12/174,173;

U.S. Provisional Patent Application No. 60/827,994, filed Oct. 3, 2006 for "Upstream Resource Optimization" corresponding to U.S. patent application Ser. No. 12/174,674;

U.S. Provisional Patent Application No. 60/827,999, filed Oct. 3, 2006 for "Upstream MF-TDMA Frequency hopping" corresponding to U.S. patent application Ser. No. 12/174,676;

U.S. Provisional Patent Application No. 60/828,002, filed Oct. 3, 2006 for "Downstream Virtual Channels Multiplexed on a Per Symbol Basis" now expired;

U.S. Provisional Patent Application No. 60/827,997, filed Oct. 3, 2006 for "Broadband Modulator for Modified Downstream Waveform" corresponding to U.S. patent application Ser. No. 12/174,196;

U.S. Provisional Patent Application No. 60/828,038, filed Oct. 3, 2006 for "Adapted DOCSIS Circuit for Satellite Media" corresponding to U.S. patent application Ser. No. 12/411,312;

U.S. Provisional Patent Application No. 60/828045, filed Oct. 3, 2006 for "Satellite Downstream Virtual Channels" corresponding to U.S. patent application Ser. No. 12/411,738 for "High Data Rate Multiplexing Satellite Stream to Low Data Rate Subscriber Terminals";

U.S. Provisional Patent Application No. 60/828035, filed Oct. 3, 2006 for "Satellite Business Method" corresponding to U.S. patent application Ser. No. 12/411,704 for "Satellite System Optimization";

U.S. Provisional Patent Application No. 60/828,032, filed Oct. 3, 2006 for "Multi-User Detection in Satellite Return Link" corresponding to U.S. patent application Ser. No. 12/411,694;

U.S. Provisional Patent Application No. 60/828,034, filed Oct. 3, 2006 for "Multi-rate Downstreaming in Multiple Virtual Channel Environment" corresponding to U.S. patent application Ser. No. 12/411,748;

U.S. Provisional Patent Application No. 60/828047, filed Oct. 3, 2006 for "Satellite Upstream Load Balancing", now expired;

U.S. Provisional Patent Application No. 60/828,048, filed Oct. 3, 2006 for "Satellite UpstreamDownstream Virtual Channel Architecture" corresponding to U.S. patent application Ser. No. 12/411,744; and U.S. Provisional Patent Application No. 60/828,046, filed Oct. 3, 2006 for "Virtual Channel Load Balancing" corresponding to U.S. patent application Ser. No. 12/411,692 for "Intra-Domain Load Balancing".

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

This invention relates to management of bandwidth resources in a packet telecommunication network, particularly at the datalink layer of a wireless network involving Multiple User Multiple Simultaneous Access (MUMSA) channels via a satellite communication network.

There are various bandwidth management schemes known for attempting to control traffic load, particularly at the datalink layer and the physical layer. Single simultaneous user traffic management is known in the random multiple access services environment for a Multiple User Single Simultaneous Access (MUSSA) channel. However, the known traffic management schemes are deficient when applied to MUMSA applications because a so-called multi-user channel of the current art allows only single simultaneous user access. As load is increased, collisions between two or more transmissions decrease efficiency. Examples relevant to the present invention are described in a paper presented at IEEE INFOCOM 2001 by Zohar Naor and Hanoch Levy, entitled "A Centralized Dynamic Access Probability Protocol for Next Generation Wireless Networks," IEEE INFOCOM 2001 *The Conference on Computer Communications*, No. 1, April 2001, pp. 767-775. In this paper, the channel load in a conventional ALOHA channel access protocol system is estimated by a measurement at the hub, then the hub sets a probability of access for the network and broadcasts that probability for use as a control or channel access restriction parameter to the network through a control channel or in a control timeslot. This protocol is not directly applicable to a multiple-simultaneous-user environment.

There are many multiple-user, single-channel protocols, but almost all such protocols rely on a central control to dole out channel access to a subset of the general user population. For example, in the well-known Code Division Multiple Access (CDMA) systems, a central authority allocates individual spreading codes to a number of users, one at a time. Thus, the random access on this MUMSA channel is accomplished by only a strictly controlled subset of the user population.

Code Reuse Multiple Access (CRMA) is an example of the MUMSA channel in which the entire user population is free to broadcast randomly. Here there is a true multiple-user, multiple simultaneous access environment, but it lacks sufficient control mechanisms to optimize channel utilization.

Consumer broadband satellite services are gaining traction in North America with the start up of star network services using Ka band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

What is needed is a system for control of access to MUMSA channels that maximizes the channel utilization under all load conditions while minimizing the amount of overhead, and maintaining the low delay of a random access approach.

SUMMARY OF THE INVENTION

According to the invention, a method for managing data traffic in a multi-user multiple-simultaneous-access (MUMSA) environment, for example in a code reuse multiple access (CRMA) environment or other physical environment having true random access with more than one transmission present at the same time, the method including steps of providing a mechanism for estimating channel load for multiple users, then using the estimate of channel load to calculate a congestion threshold (CT) on an ongoing basis (which may be a probability of access), selecting a current congestion threshold, and then at each terminal performing an experiment using that congestion threshold value and a random number generator to determine if a packet is eligible to be transmitted, thus throttling the random transmission of packets so that the transmitted load from the terminal has a rate of packet transmission that is less than or equal to the congestion threshold times the offered load (from the user), where the congestion threshold value is related to the probability of a globally successful transmission of a number of simultaneously transmitted packets. In addition, the terminal may include a quality of service (QOS) factor to control the throttling of the transmitted load, allowing predictable data rates, latency and packet error rates. The experiment performed at the user terminal with congestion threshold value and the random number generator output as parameters determines whether the packet is actually transmitted or discarded. A basic load detection technique is disclosed for determining actual loads at the hub.

Use of CRMA for Upstream Data in an Environment with Virtual Downstream Channels Further according to the invention, in an environment where there are virtual downstream channels for packets, where the upstream packet streams are not directly affiliated with any of the downstream packet streams and where the upstream packet streams can be associated independently through common CRMA channels, channel congestion can be mitigated using CMRA techniques. In particular, when a virtual downstream channel becomes congested, the related upstream channels can each be throttled separately, so that their request function is suppressed, thereby mitigating against the clogging of the virtual downstream channel and the channel load is balanced. In another alternative or in addition, the users of the virtual downstream channel can be assigned to another virtual downstream channel to which the downstream packet streams have been transferred. The motivation for throttling and channel switching is on the basis of not only the downstream (data capacity) requirements but also upstream (data capacity) requirements.

In a first embodiment, an upstream channel is associated with a single virtual downstream channel. (One to one). In that embodiment, each virtual downstream channel would throttle its own affiliated upstream channels. In another embodiment, upstream channels are unaffiliated with a downstream channel or can be pooled. (One to many). Because of the advantages of pooling large numbers of terminals in random access channels, terminals of multiple virtual downstream channels may by served by common random upstream channels. Preferably, terminals of all virtual downstream channels are pooled into a single common random upstream channel. In practice the terminals are grouped by capability, level of service, frequency band, speed of transmission and the like to effect the creation a group of upstream channels unaffiliated with any downstream channel, such that a mechanism, such as herein disclosed, is useful for managing the operation of the terminals. Control can be individually or by upstream channel.

The invention will be better understood by reference to the following detailed description in connection with the accompanying drawings.

DETAILED DESCRIPTION OF THE INVENTION

Figure 1:
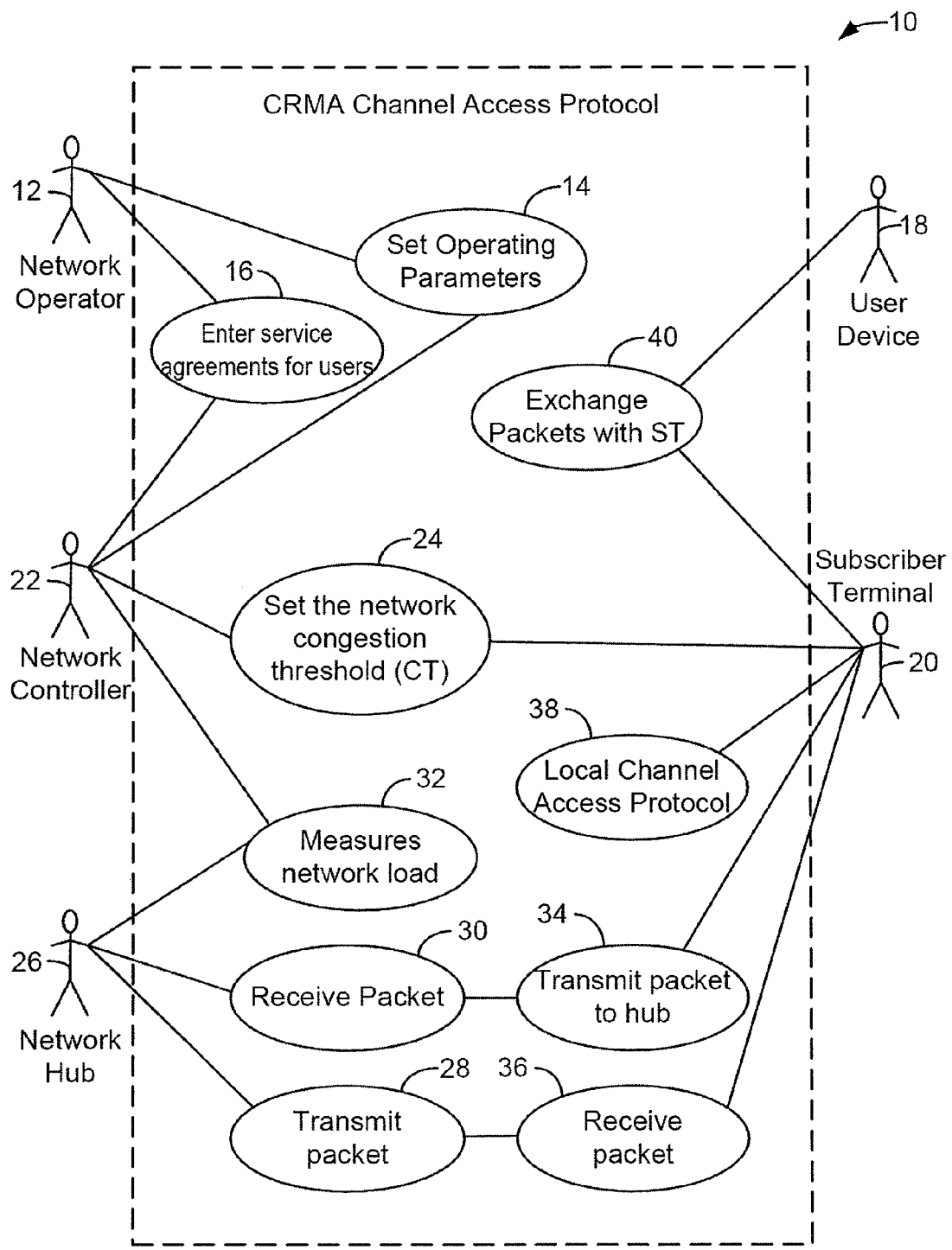
FIG. 1 is a use-case diagram of a Code Reuse Multiple Access (CRMA) Channel Access Protocol (CCAP).

FIG. 1 is an overview in a Use-Case diagram 10 which illustrates schematically each of the components of the invention and each of the cases in which the components or "actors" participate.

The actors include:

Network Operator 12: The Network Operator 12 is the entity including the people and business concerns of a service provider (SP) that set the service policies (including quality of service (QOS) parameters) including the services of setting of operating parameters 14 and entering service agreements 16 for users of user devices 18 and subscriber terminals 20.

Network Controller 22: The Network Controller 22 is the service in the form of computer software which computes a congestion threshold (CT) using parameters set by the Network Operator 12 and based on the measurements taken by a Network Hub 26.

Network Hub 26: The Network Hub 26 comprises the communications equipment (antennas, radios, modems and software) which transmits packets 28 and receives packets 30 from subscriber terminals 20 and measures the network load 32, that is, the amount of traffic being presented to the network. In general, any or even all of the subscriber terminals can perform the network load measurement, so long as they can receive the shared channel.

Subscriber Terminal 20: The Subscriber Terminal 20 comprises the communication equipment at the user premises that has the functions of transmitting data to 34 and receiving data from 36 the Network Hub 26 and performs the local portion of the channel access protocol 38 as herein explained.

User Device 18: The User Device 18 is the local computer (or other network device) located at the customer premises where the network traffic originates and terminates. It has the function of exchanging packets 40 with the subscriber terminal 20.

The basic embodiment of the CRMA Channel Access Protocol (CCAP) provides for robust access to the shared CRMA channel according to a best-efforts (BE) services standard. BE services provide no guarantees of minimum throughput or delay. According to the invention, the CRMA CAP services are extended by providing network services with a guaranteed quality of service (QOS). This extension is explained further herein.

Figure 2:
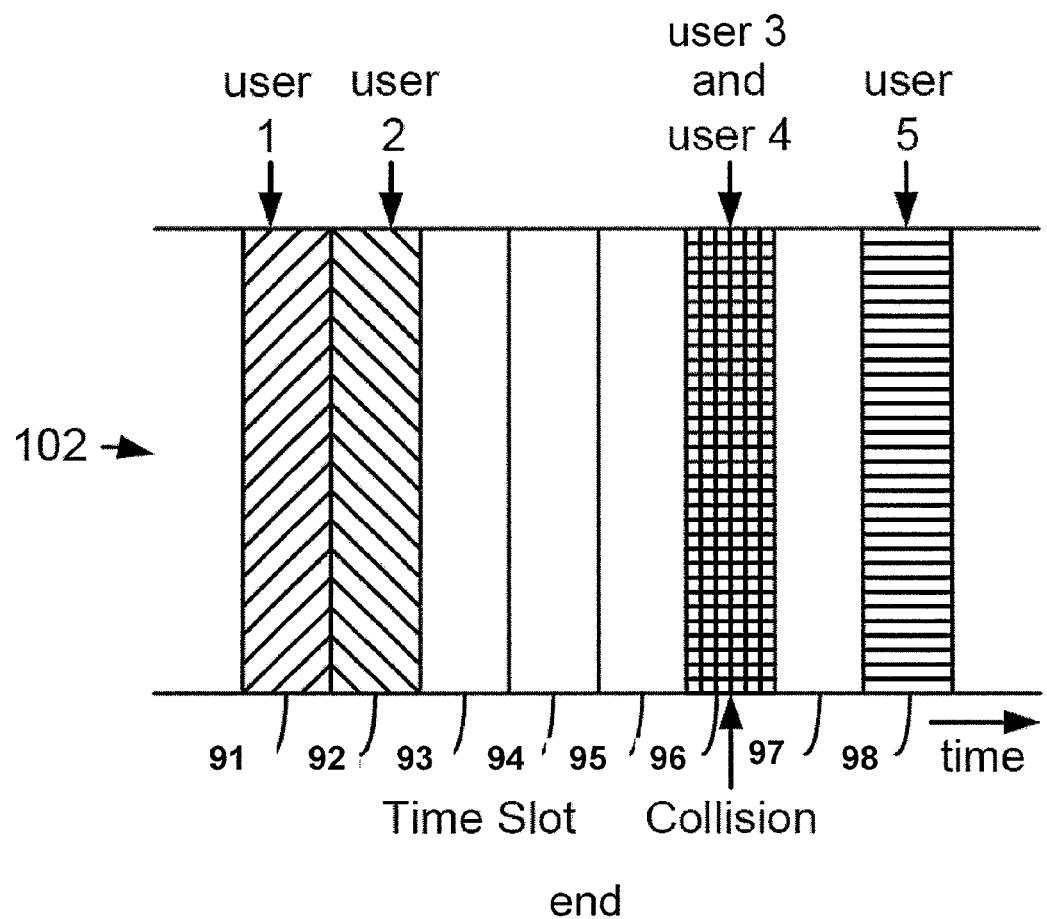
FIG. 2 is a diagram of operation of a method of the prior art.

It is useful to examine prior art Multiple User Single Simultaneous Access ((MUSSA) channel configurations for comparison. Referring to FIG. 2, a MUSSA channel 102 of the prior art is divided into time slots 91-98 that can accommodate exactly one user at a time. In this example, User 1 and User 2 transmit successfully in adjacent time slots 91, 92, but User 3 and User 4 both attempt to use the same time slot 96, and both are unsuccessful, an event known as a collision. User 5 then transmits successfully in timeslot 98. For maximum throughput in such channels, the channel usage must be limited so that, on average, only a small fraction of the slots are used. As a result of this limitation, the collisions that do occur are almost always between exactly two users. In this example, the other three users were able to transmit successfully, while the two colliding transmissions were lost and would require a further attempt, thus reducing ultimate channel throughput.

Figure 3A:
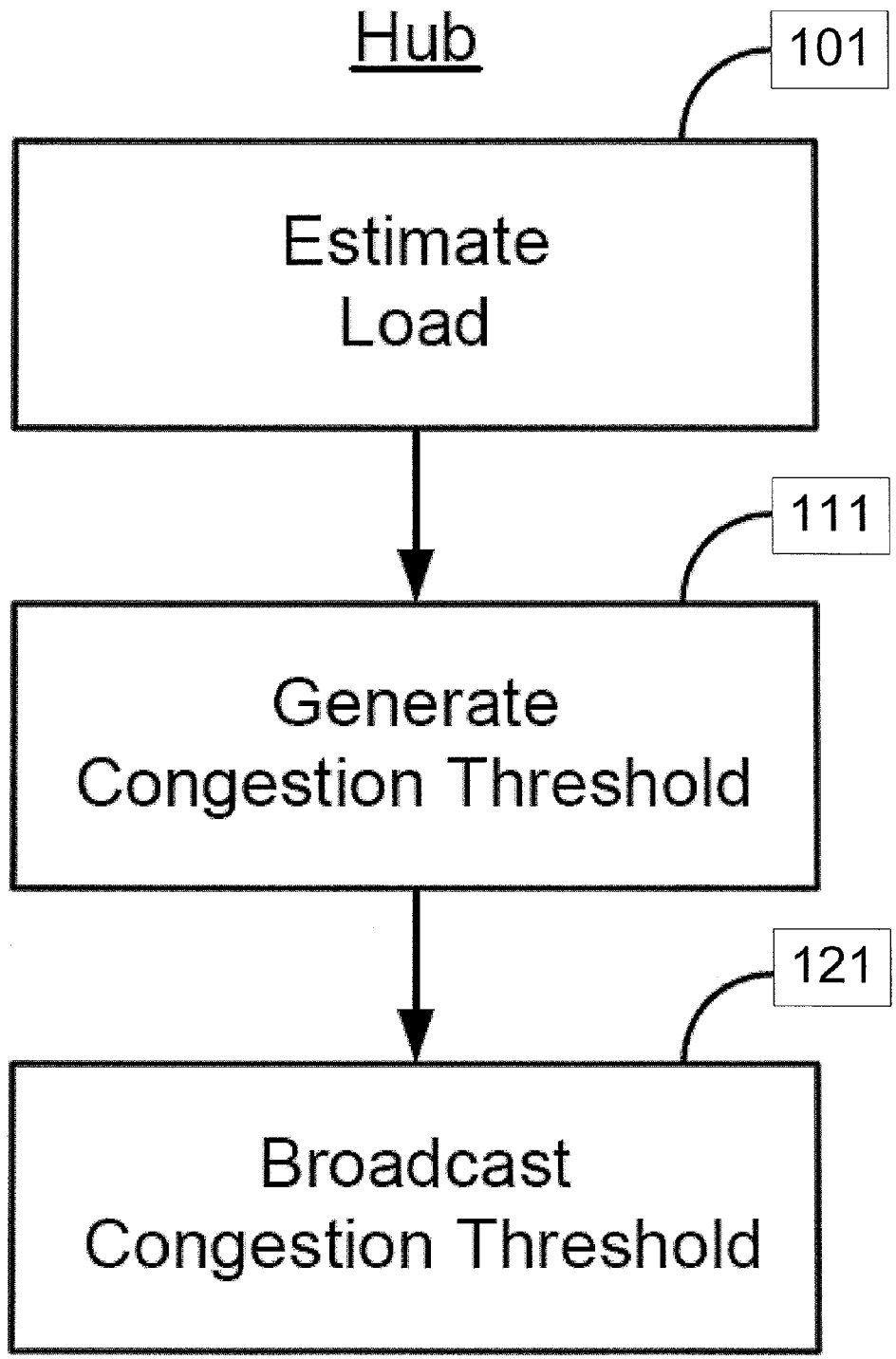
FIG. 3A is a high level flow diagram for illustrating load estimate techniques at a network controller of the prior art.
Figure 3B:
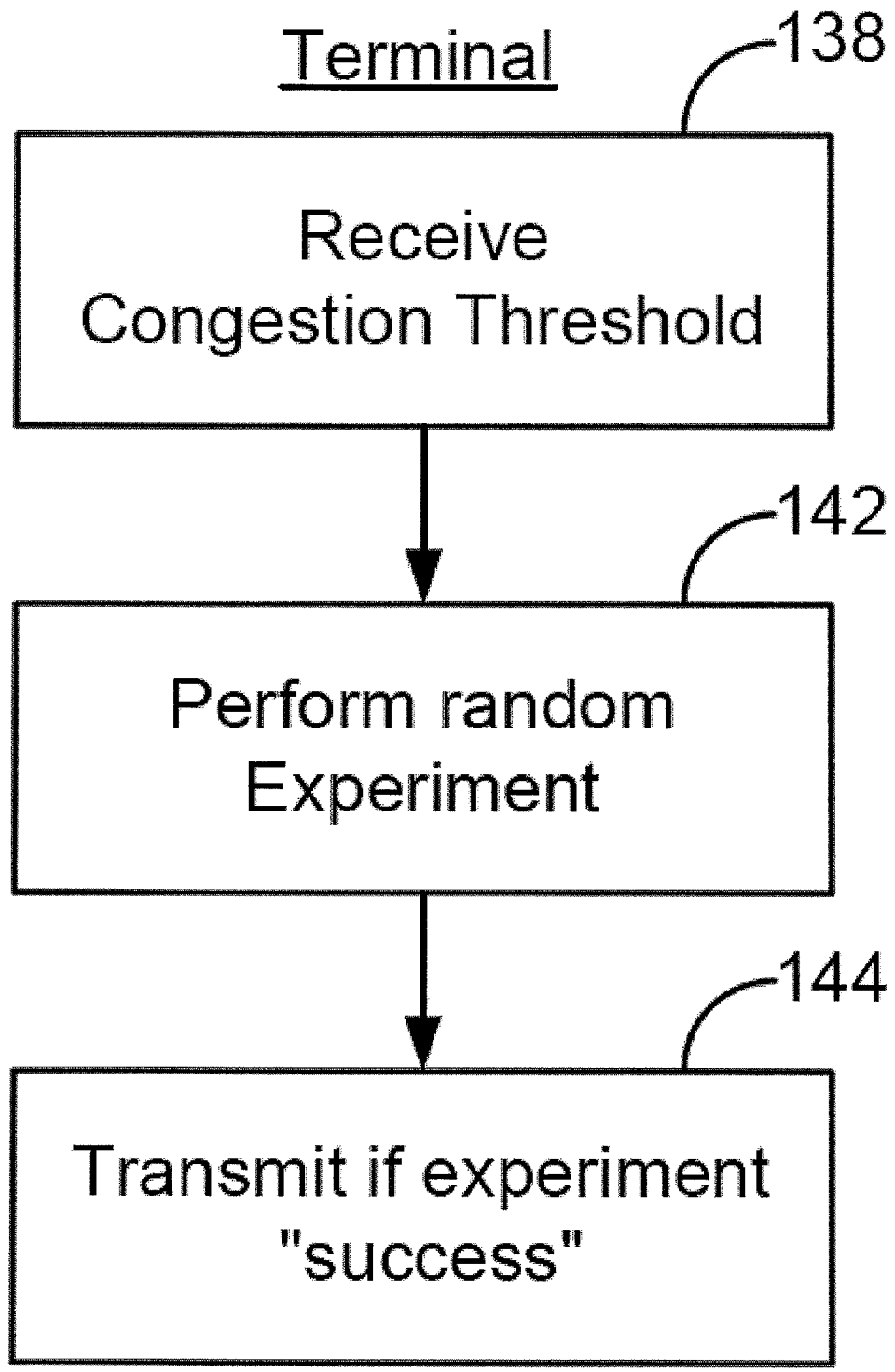
FIG. 3B is a high level flow diagram for illustrating load estimate techniques at a terminal of the prior art.

Referring to FIG. 3A, at a high level, the network controller 22 of the prior art estimates load (Step 101), generates a congestion threshold value or equivalent (Step 111) and broadcasts the congestion threshold value to all subscriber terminals (Step 121). Referring for FIG. 3B, at each subscriber terminal in the prior art, the congestion threshold value is received (Step 138), performs a random experiment using the received congestion threshold (Step 142), and broadcasts the packet to the hub if the experiment is a success (Step 144).

Figure 3C:
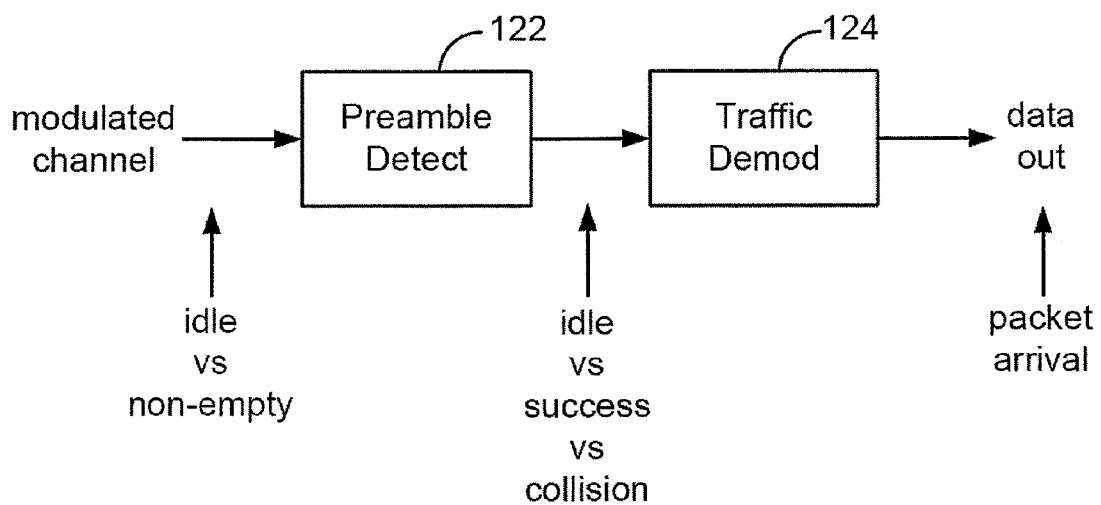
FIG. 3C is a diagram for illustrating load estimate techniques at a network controller.

Referring to FIG. 1, according to the prior art, various techniques are employed to estimate load at the hub 26, which has a preamble detector 122 of FIG. 3C to detect from the incoming channel, and it has a traffic demodulator 124 to provide data output. The incoming modulated channel can be sampled to determine whether it is idle or non-empty during the sampling interval. After the preamble detector, the data can be monitored for idle, successful packet transmission or collision. After the traffic demodulator 124 the data stream can be monitored for packet arrival.

Figure 4A:
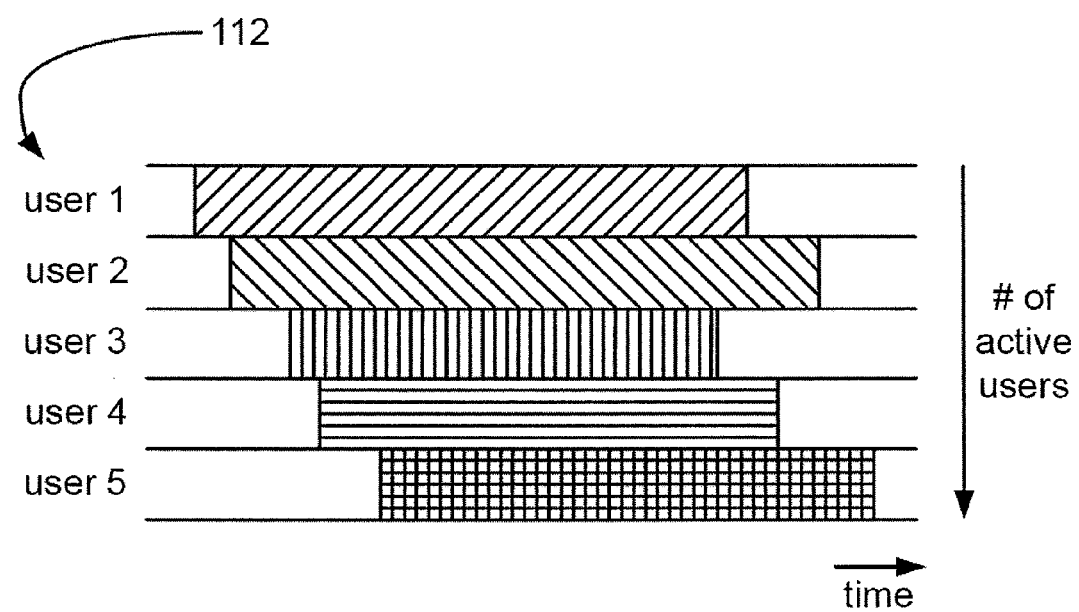
FIG. 4A is a diagram of operation of a method according to the invention.

Referring to FIG. 4A, a Multiple User Multiple Simultaneous Access (MUMSA) channel 112 of the invention is depicted. The MUMSA channel 112 is not divided into time slots. Successful transmissions from a number of users can overlap in time, made possible by use of Pseudo Noise (PN) spreading sequences. Each transmission is not time aligned with the other transmissions and the transmissions can also vary in length, as opposed to the fixed length, slotted transmissions of the channel 102 of FIG. 2. Here, the number of active users on the channel can vary instantaneously while always taking on integer values. Although not shown in this example, a rough analog of the MUSSA collision will occur when the instantaneous number of active users exceeds the maximum number of transmissions that the channel can support. In this MUMSA collision, by definition, a large number of transmissions are lost, as opposed to the two transmissions typically lost in a MUSSA collision. As the number of simultaneous users increases, however, the statistical behavior of the channel can be more accurately predicted upon which the present invention capitalizes.

Figure 4B:
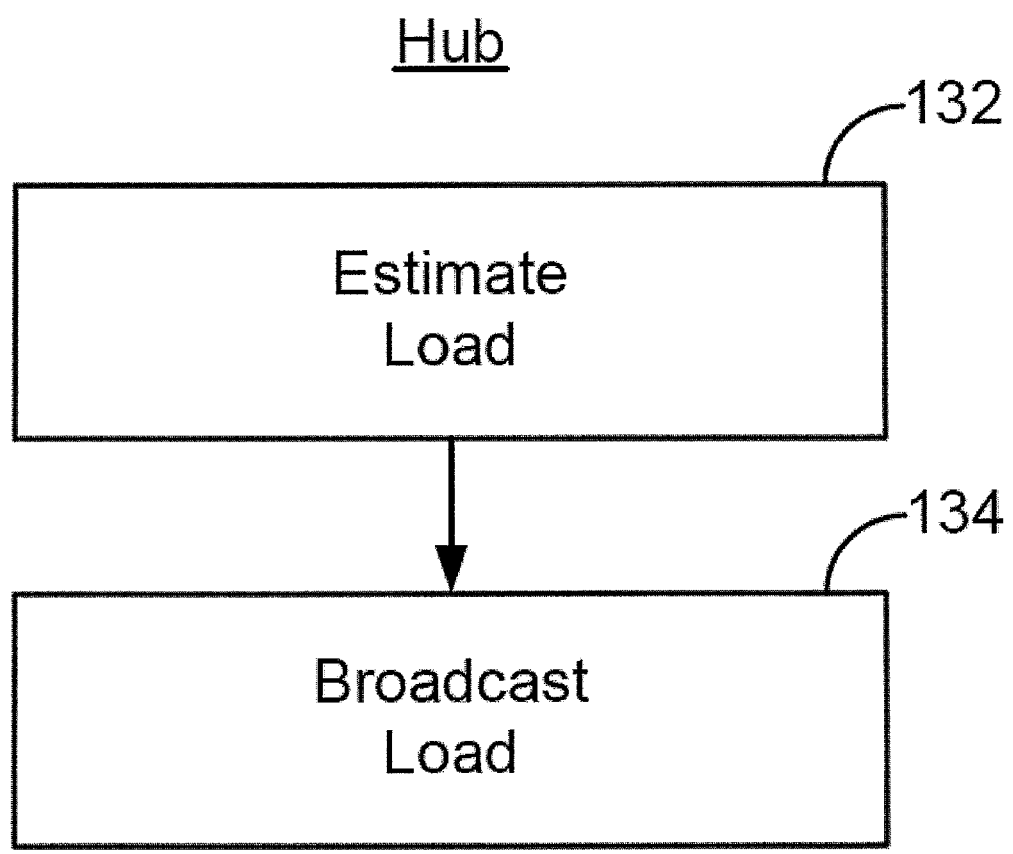
FIG. 4B is a high level flow chart of operation related to quality of service at the network controller.
Figure 4C:
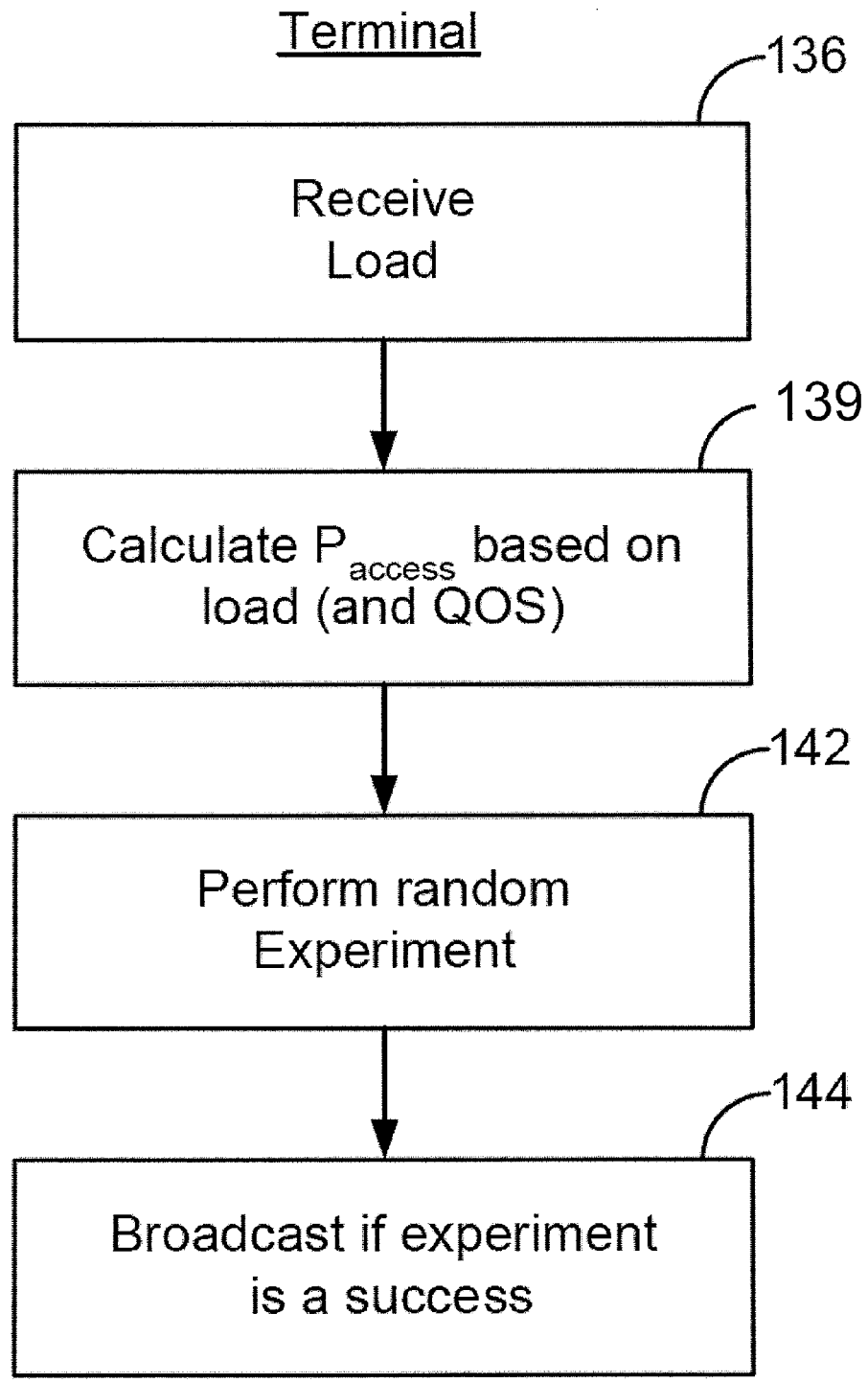
FIG. 4C is a high level flow chart of operation related to quality of service at a user terminal.

Referring to FIG. 4B, according to a specific embodiment of the invention, a combination of congestion threshold and quality of service activities is performed at the hub 26 which are used to estimate load (Step 132), and the hub 26 broadcasts the load (Step 134), whereupon the terminal 20 (FIG. 4C) receives the load (Step 136), calculates a congestion threshold value, specifically a probability of access based on load and quality of service, as described (Step 139), then performs a random experiment (Step 142) with the locally-calculated congestion threshold and broadcasts the packet if the experiment is a success (Step 144). Each subscriber terminal enjoys this autonomy.

Figure 5:
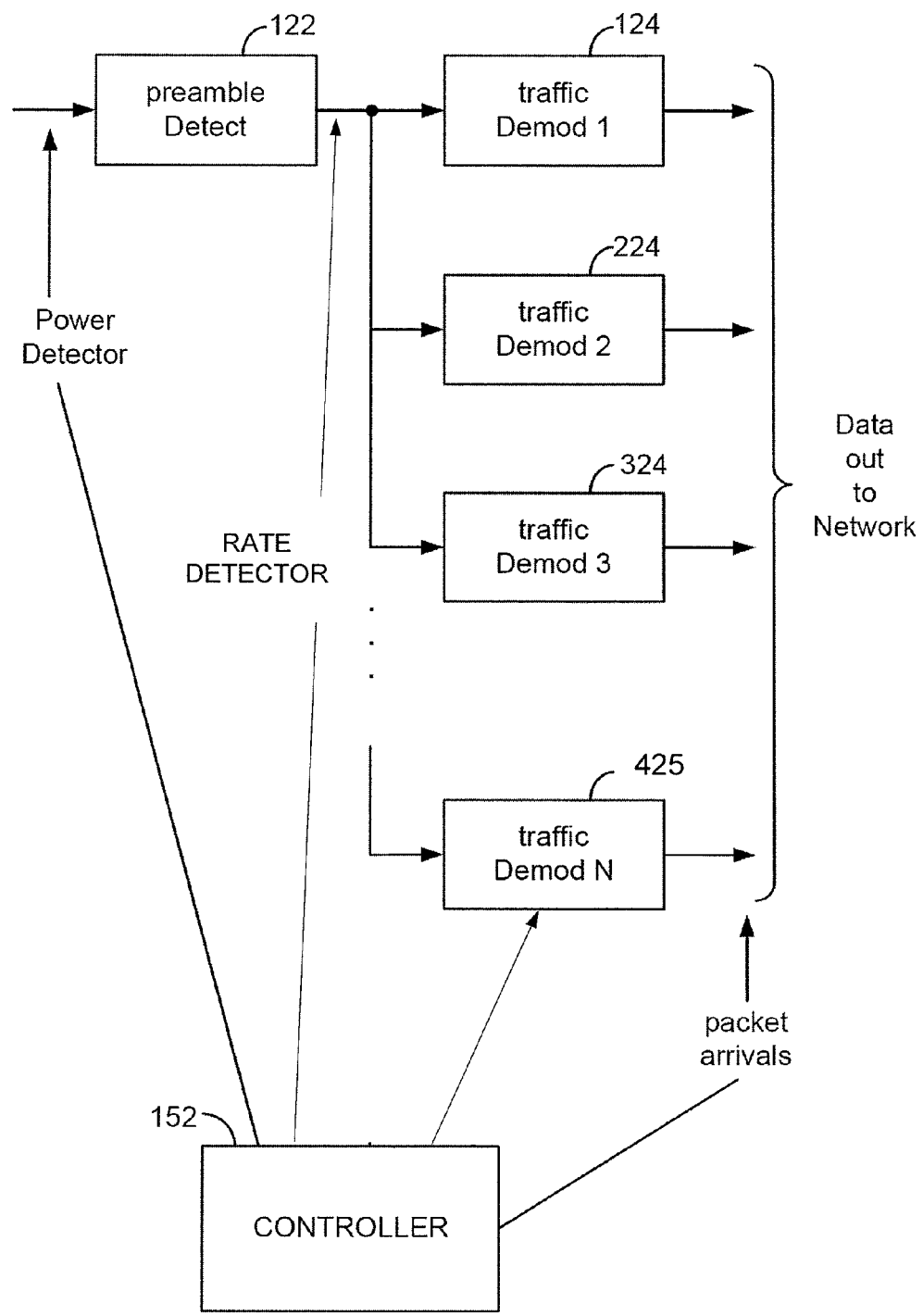
FIG. 5 is a diagram for illustrating a basic apparatus for performing a load estimation technique.

In accordance with the invention, and referring to FIG. 5, in order to allow a number of active load estimates to proceed autonomously and with greater versatility, a controller 152 senses the rate of preamble detections at the output of a preamble detector 122, and further senses the number of active traffic demodulators 124, 224, 324, 425. The controller 152 alternatively senses the received power into the preamble detector and/or tests for packet arrivals at their outputs to the network. These tests can be combined. These options provide for a finer resolution estimate of the instantaneous load of the network.

Figure 6:
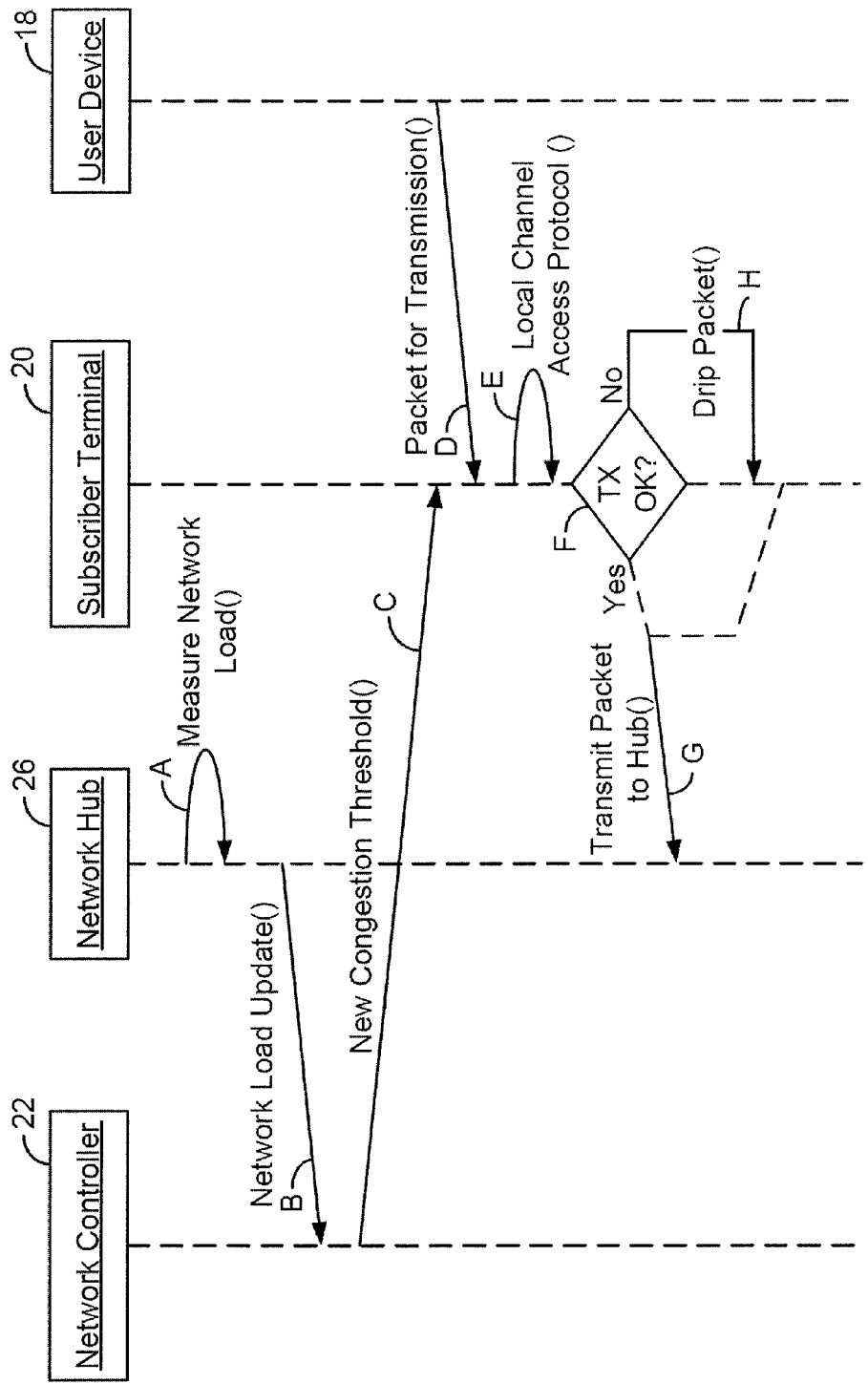
FIG. 6 is a timing diagram showing the computation of a congestion threshold and its application to congestion control.

The CCAP with extensions according to the invention are performed by the network controller 22 and by the subscriber terminals 20. The basic sequence of this protocol is shown in FIG. 6. The Network Hub 26 measures the network load by a process not directly germane to this invention (Step A) and reports with a Network Load Update to the Network Controller 22 (Step B). The Network Controller 22 conveys a new congestion threshold to the Subscriber Terminal 20 (Step C) in preparation for receipt of the next packet for transmission from the User Device 18 (Step D). The local access protocol (Step E) is invoked at the Subscriber Terminal 20 for the packet received for transmission whereupon the decision is made as to whether the packet is to be transmitted (Step F). If so, it is transmitted to the Network Hub 26 (Step G). If not, the packet is dropped (Step H).

Figure 7:
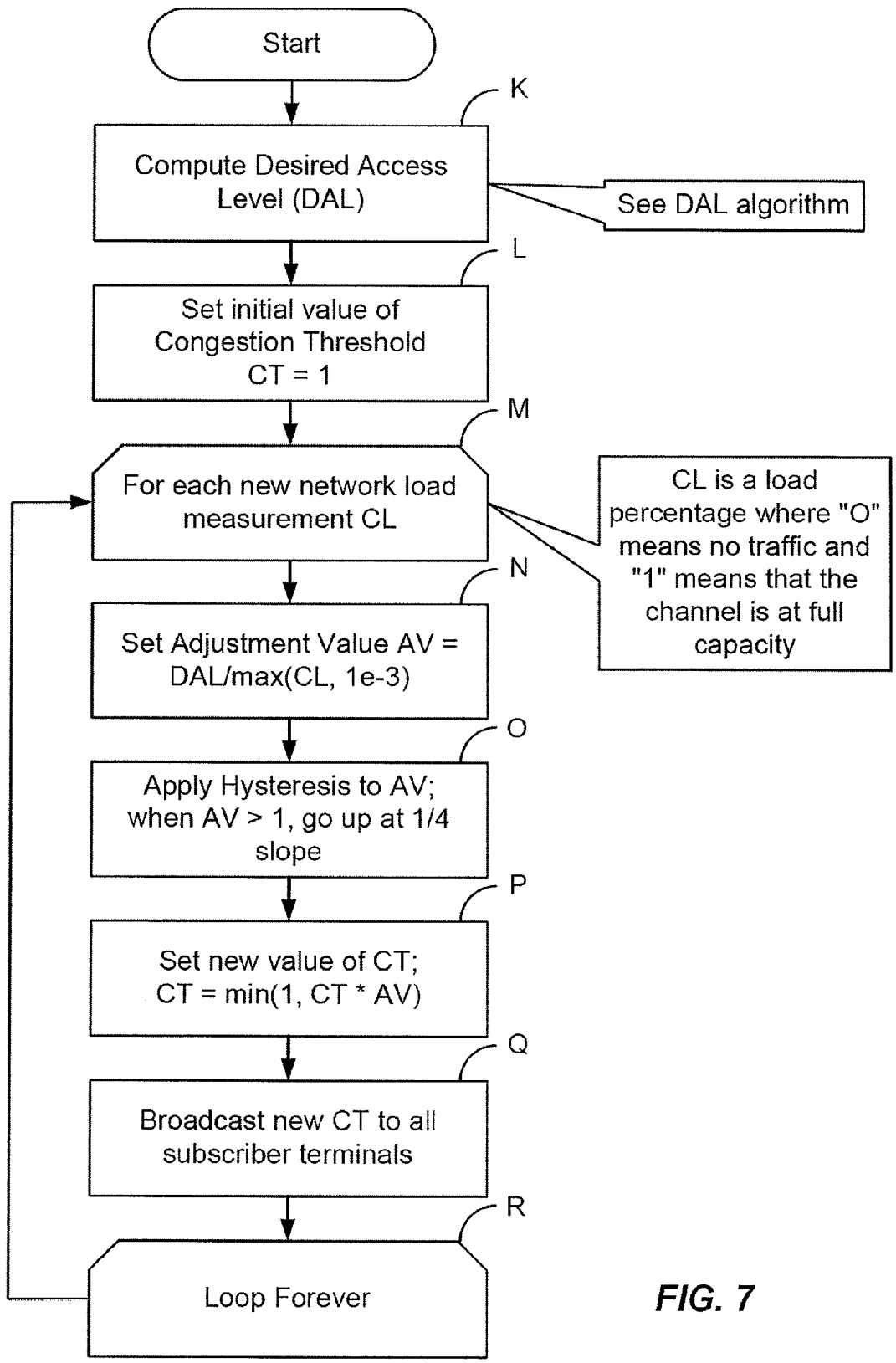
FIG. 7 is a flow chart of a technique for determining and disseminating a congestion threshold value.

FIG. 7 is a flow chart for computation of the congestion threshold at the Network Controller 22. First a desired access level (DAL) is computed, as hereinafter explained (Step K). An initial value of the congestion threshold is set or preset to 100% (CT=1) (Step L). An iterative process begins with each new network load measurement to establish a channel load CL from zero (CL=0) to 100% (CL=1) (Step M). An adjustment value AV is set as the desired access level divided by channel load (DAL/CL) or more precisely, the desired access level divided by the maximum of the channel load or 0.001 (where 0.001 is set to avoid a division by zero) (Step N). Hysteresis is applied to the adjustment value (AV) so that when AV>1, it goes up at ¼ slope (Step O). Thereafter, the new congestion threshold is set to be the old congestion threshold multiplied by the adjustment value up to a value of 100%, or more precisely, the minimum of 1 and CT*AV (Step P). This new congestion threshold is then broadcast to all subscriber terminals (Step Q), and the iteration repeats (Step R).

The desired access level (DAL) is computed based on the capacity of the system (in terms of number of possible simultaneous transmissions without degradation) and the quality requirements (in terms of packet error rates).

Below is a depiction of the process for determining the probability P of access for a given network capacity:

Assuming a Poisson process and a given access rate "r" the probability of exactly "k" accesses is:

$$Paccess(r, k) := \frac{r^k \cdot e^{-r}}{k}$$

Determine the percentage of time that it is acceptable for the number of transmissions to exceed multiple access threshold ($P_{excess}$). For a given network capacity, expressed as the Multiple Access Threshold M, and a given rate of transmissions we know $$\sum_{k=M+1}^{\infty} Paccess(r, k) = P_{excess}$$

So, just find the maximum rate "r" such that:

$$\sum_{k=1}^{M} Paccess(r, k) < 1 - P_{excess}$$

Figure 8:
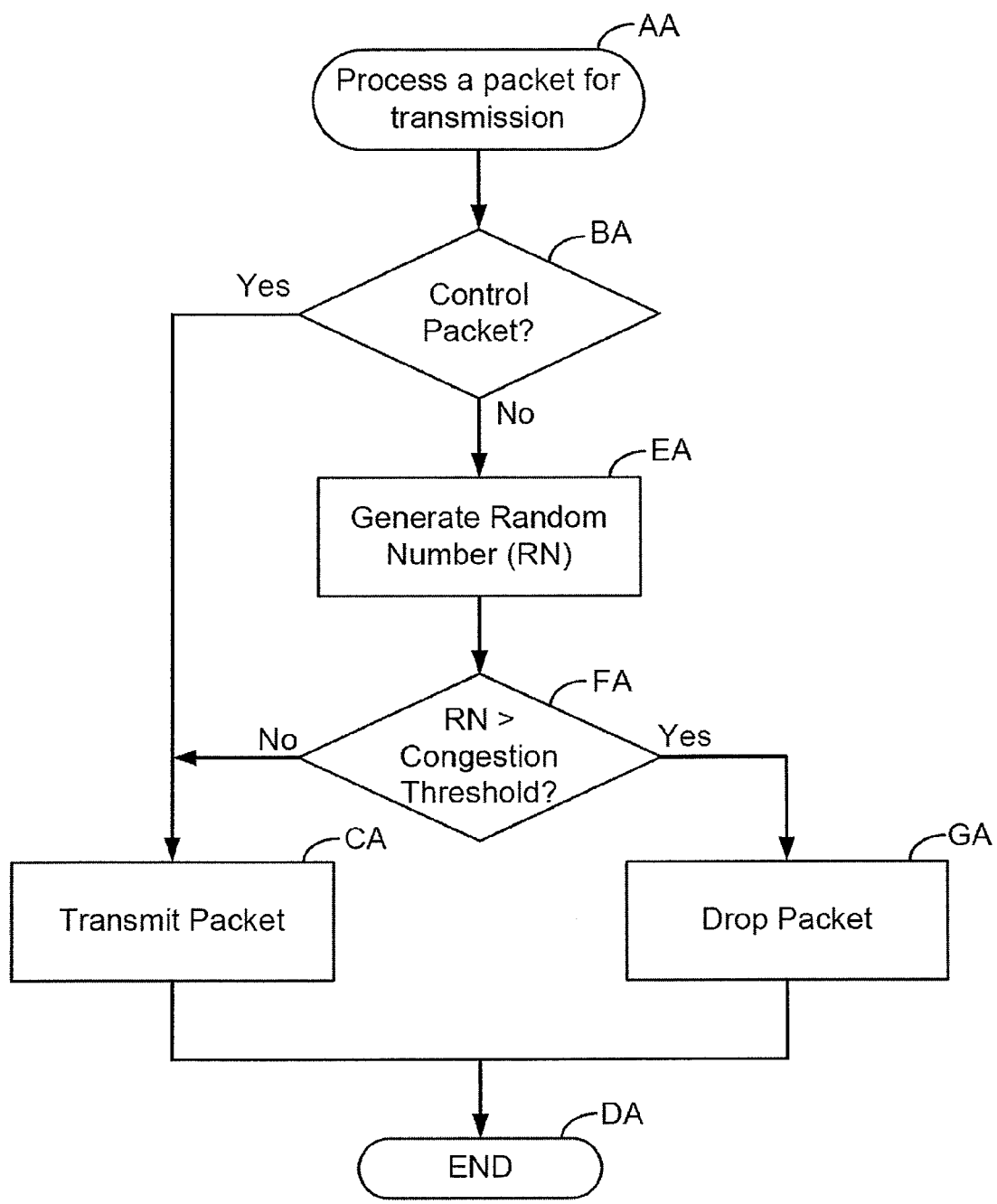
FIG. 8 is a flow chart illustrating how a local portion of the access protocol is performed at each terminal.

The Congestion Threshold (CT) is used by each subscriber terminal in the network to perform the local portion of the CCAP, as explained in connection with FIG. 8. Between the network controller 22 and a representative Subscriber Terminal (ST) 20, the first step is to process a packet for transmission (Step AA), then determine whether it is a control packet (Step BA), and if not, to transmit the packet (Step CA) then end (Step DA) to prepare to repeat the process. If it is a control packet, then a (pseudo-)random number is generated Step EA) and tested against a threshold (Step FA) established by policy or default. If the threshold is not met, the packet is transmitted (Step CA), otherwise it is dropped (Step GA) and the process is ended (Step DA) to be prepared to repeat.

The quality of services (QOS) extensions to this invention allow the network to offer services with a guaranteed QOS in terms of a guaranteed minimum data rate and guaranteed maximum packet error rate. This is accomplished by the addition of a mechanism to admit QOS services into the network and by modification of the processes undertaken in the Network Controller to set the Congestion Threshold (CT) and the algorithm in the Subscriber Terminal to perform the Local CCAP.

Figure 9:
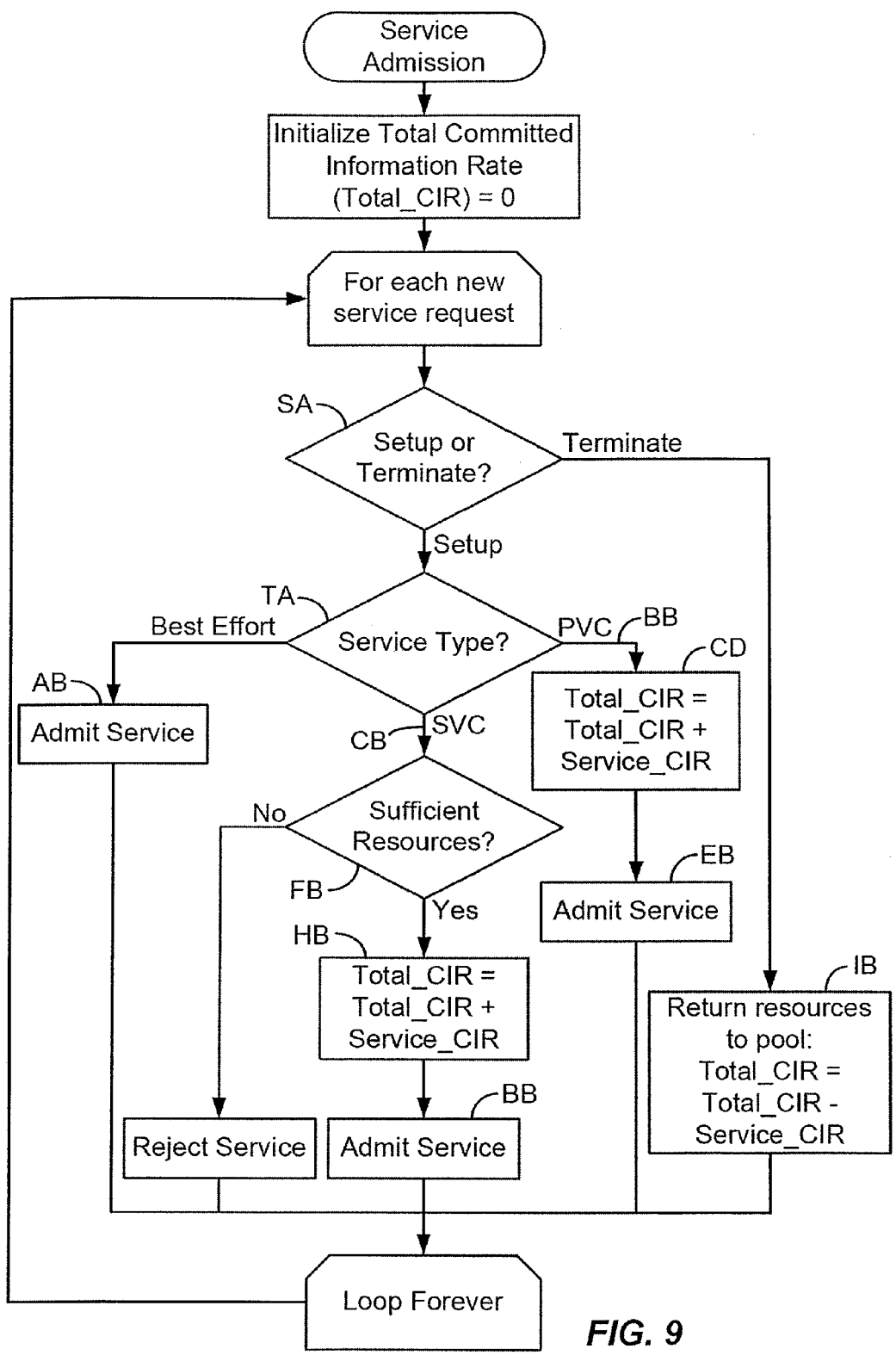
FIG. 9 is a flow chart illustrating the algorithm for setup and teardown of virtual circuits at the network terminal for each request from a subscriber terminal.

A Service Admission Protocol (SAP) for the QOS extensions is shown in FIG. 9. After setup (Step SA), service types are determined (Step TA), and all Best Effort (BE) services are automatically admitted (Step AB), since no guarantees are made for these services. QOS extensions are provided on a virtual circuit basis: a terminal may have one or more virtual circuits. The QOS extensions fall into two categories: Permanent Virtual Circuits (PVCs) (Step BB) and Switched Virtual Circuits (SVCs) (Step CB). PVCs are allocated on a long-term basis and must always be admitted (Step EB). SVCs are allocated on request and are admitted (Step GB) if the resources are available to meet the service level agreement of the request (Step FB). It is thus important that safeguards be built into the service management system to prevent over-commitment of PVCs. These safeguards are the subject to the service provider's policies, which will rely on the capacity provided by the subject invention.

The network controller also uses the algorithm of FIG. 9 to maintain a running tally of the committed information rate (Total_CIR) (Steps DB, HB, IB). This is used in a modified version of the Congestion Threshold (CT) calculation, as follows:

Compute BE_Load=max(CL−Total_CIR,1)
Compute BE_DAL=DAL−Total_CIR
Compute BE_Load=max(CL−Total_CIR,1)
Compute BE_DAL=DAL−Total_CIR
AV=BE_DAL/BE_Load
Apply Hysteresis to AV, AV>1, go up at ¼ slope
Set CT=min(1, CT*AV)

Figure 10:
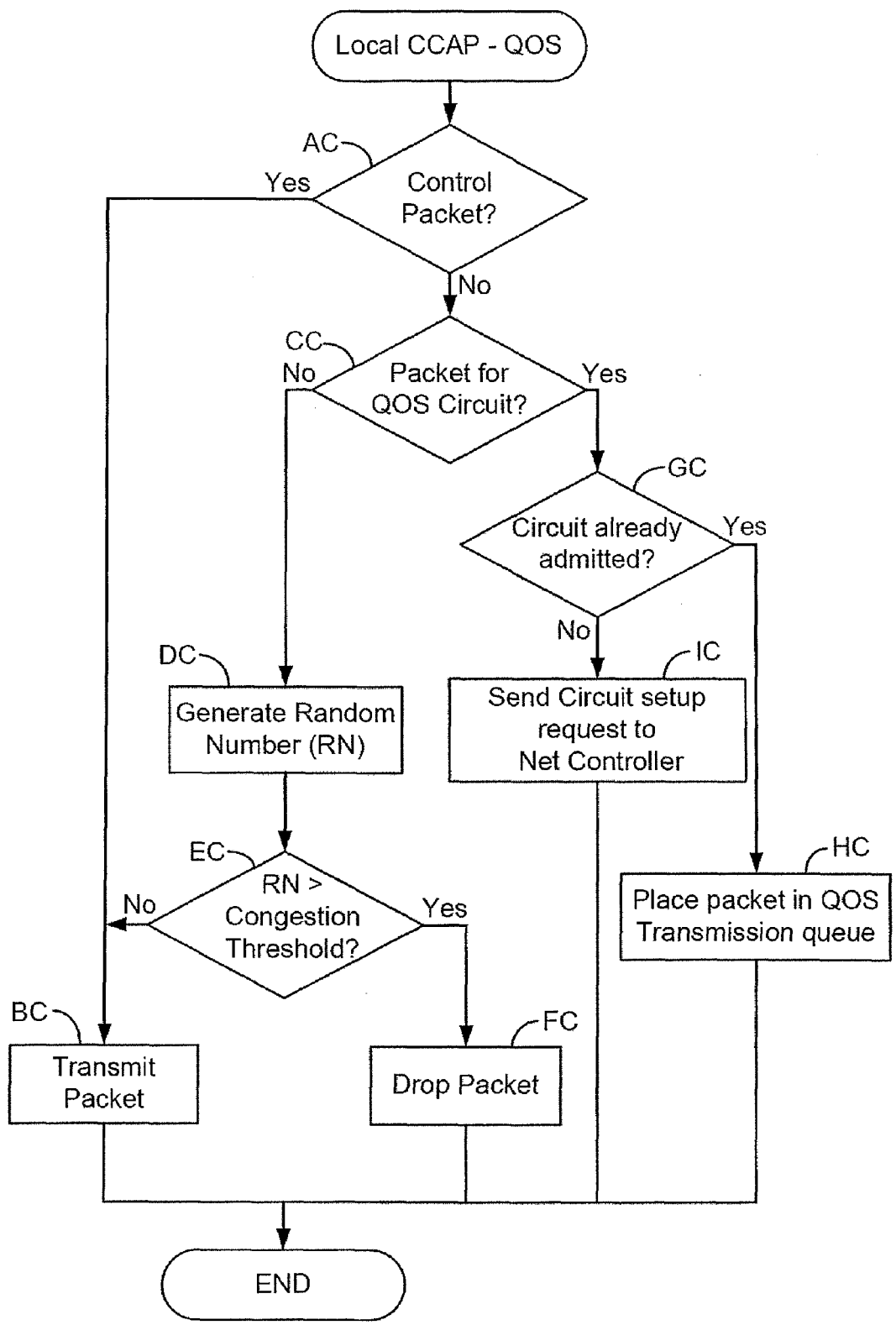
FIG. 10 is a flow chart for the handling of a packet according to a local MUMSA-CAP-QOS at a subscriber terminal.

The Subscriber Terminal then uses a modified version of the Local CCAP (herein Local CCAP—QOS) for handling each packet. This is shown in FIG. 10. The control packets are identified (Step AC), bypass the QOS process and are transmitted (Step BC). Packets not intended for the QOS circuit are identified (Step CC), a random number is generated (Step DC) and compared with the congestion threshold (EC). If less than the congestion threshold the packet is dropped (Step FC) rather than transmitted.

The packet is tested to determine if the packet is intended for the QOS circuit (Step GC), whereupon it is placed in the QOS transmission queue (Step HC) and not immediately transmitted. The packets is then processed according to the QOS transmission queue handling procedures. If not, then a circuit setup request is sent to the network controller (Step IC).

The QOS packets which have been placed in a QOS Transmission Queue are handled as noted in Step HC, wherein, according to the invention, packets must be transmitted at least at a rate provided by the service agreement CIR. The terminal may also transmit packets at rates beyond the CIR, assuming there is network capacity. For transmission of the excess packets, the subscriber terminal simply applies the standard CCAP algorithm.

When the transmission queue is empty for a sufficient length of time, or when the service is terminated via a higher layer protocol, the Subscriber Terminal must send a request to tear-down the virtual circuit.

The following information is given as background in order to understand the environment of high-speed satellite communication, particularly as employed to service subscribers accessing high speed networks.

Figure 11A:
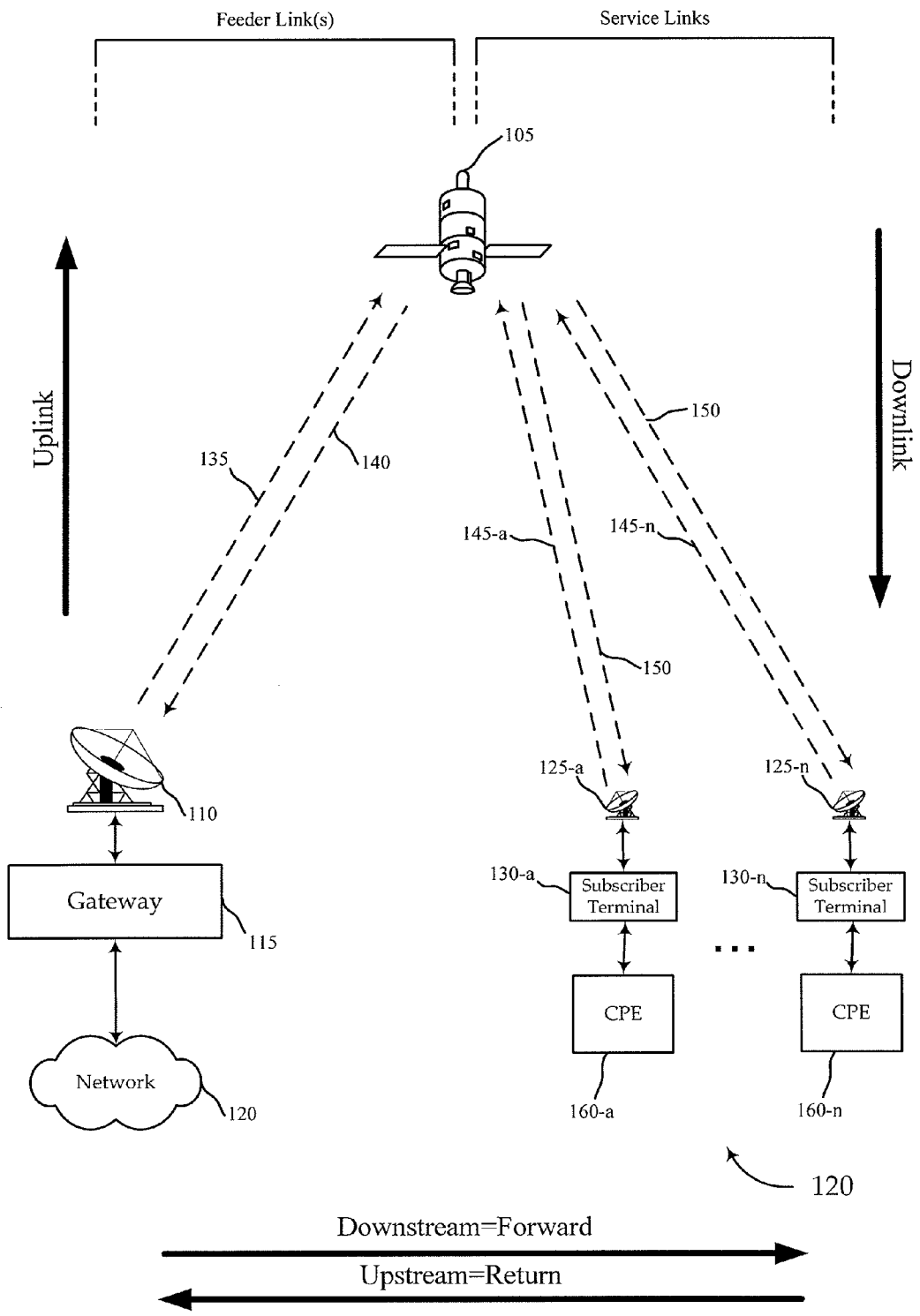
FIG. 11A is a block diagram of an exemplary satellite communications system 100 configured according to various embodiments of the invention.

FIG. 11A is a block diagram of an exemplary satellite communications system 100 configured according to various embodiments of the invention. The satellite communications system, 100 includes a network 120, such as the Internet, interfaced with a gateway 115 that is configured to communicate with one or more subscriber terminals 130, via a satellite 105. A gateway 115 is sometimes referred to as a hub or ground station. Subscriber terminals 130 are sometimes called modems, satellite modems or user terminals. As noted above, although the communications system 100 is illustrated as a geostationary satellite 105 based communication system, it should be noted that various embodiments described herein are not limited to use in geostationary satellite based systems, for example some embodiments could be low earth orbit (LEO) satellite based systems.

The network 120 may be any type of network and can include, for example, the Internet, an IP network, an intranet, a wide-area network ("WAN"), a local-area network ("LAN"), a virtual private network, the Public Switched Telephone Network ("PSTN"), and/or any other type of network supporting data communication between devices described herein, in different embodiments. A network 120 may include both wired and wireless connections, including optical links. Many other examples are possible and apparent to those skilled in the art in light of this disclosure. As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals) directed to a destination in the network 120, and can format the received signals for transmission along the network 120.

A device (not shown) connected to the network 120 may communicate with one or more subscriber terminals, and through the gateway 115. Data and information, for example IP datagrams, may be sent from a device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 and WiMAX standards. The link 135 from the gateway 115 to the satellite 105 may be referred to hereinafter as the downstream uplink 135.

The gateway 115 may use an antenna 110 to transmit the signal to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception of such signals. The satellite 105 may process the signals received from the gateway 115 and forward the signal from the gateway 115 containing the MAC frame to one or more subscriber terminals 130. In one embodiment, the satellite 105 operates in a multi-beam mode, transmitting a number of narrow beams each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), or any number of hybrid or other schemes known in the art.

A subscriber terminal, for example 130-a, may transmit data and information to a network 120 destination via the satellite 105. The subscriber terminal 130 transmits the signals via the upstream uplink 145-a to the satellite 105 using the antenna 125-a. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The link from the satellite 105 to the gateway 115 may be referred to hereinafter as the upstream downlink 140.

Figure 11B:
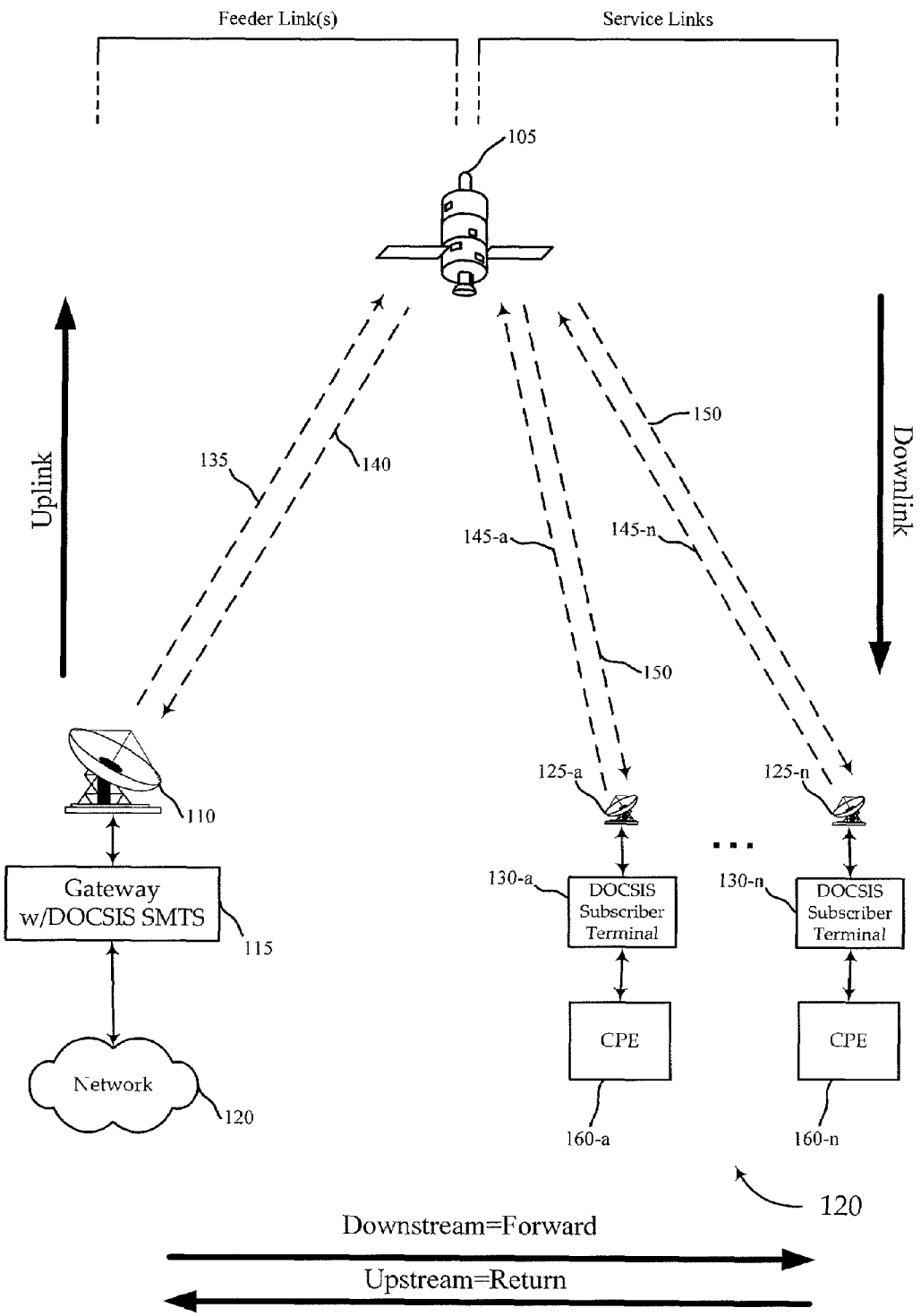
FIG. 11B is a block diagram illustrating an alternative embodiment of a satellite communication system.

Turning to FIG. 11B, a block diagram is shown illustrating an alternative embodiment of a satellite communication system 100. This communication system 100 may, for example, comprise the system 100 of FIG. 11A, but is in this instance described with greater particularity. In this embodiment, the gateway 115 includes a Satellite Modem Termination System (SMTS), which is based at least in part on the Data-Over-Cable Service Interface Standard (DOCSIS). The SMTS in this embodiment includes a bank of modulators and demodulators for transmitting signals to and receiving signals from subscriber terminals 130. The SMTS in the gateway 115 performs the real-time scheduling of the signal traffic through the satellite 105, and provides the interfaces for the connection to the network 120.

In this embodiment, the subscriber terminals 135 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 Gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) is used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a minimum number of space hardware elements. Spotbeam size and TWTA power may be optimized to achieve maximum flux density on the earth's surface of −118 decibel-watts per meter squared per megahertz ($dbW/m^2/MHz$). Thus, using approximately 2 bits per second per hertz (bits/s/Hz), there is approximately 1 Gbps of available bandwidth per spot beam.

Figure 12A:
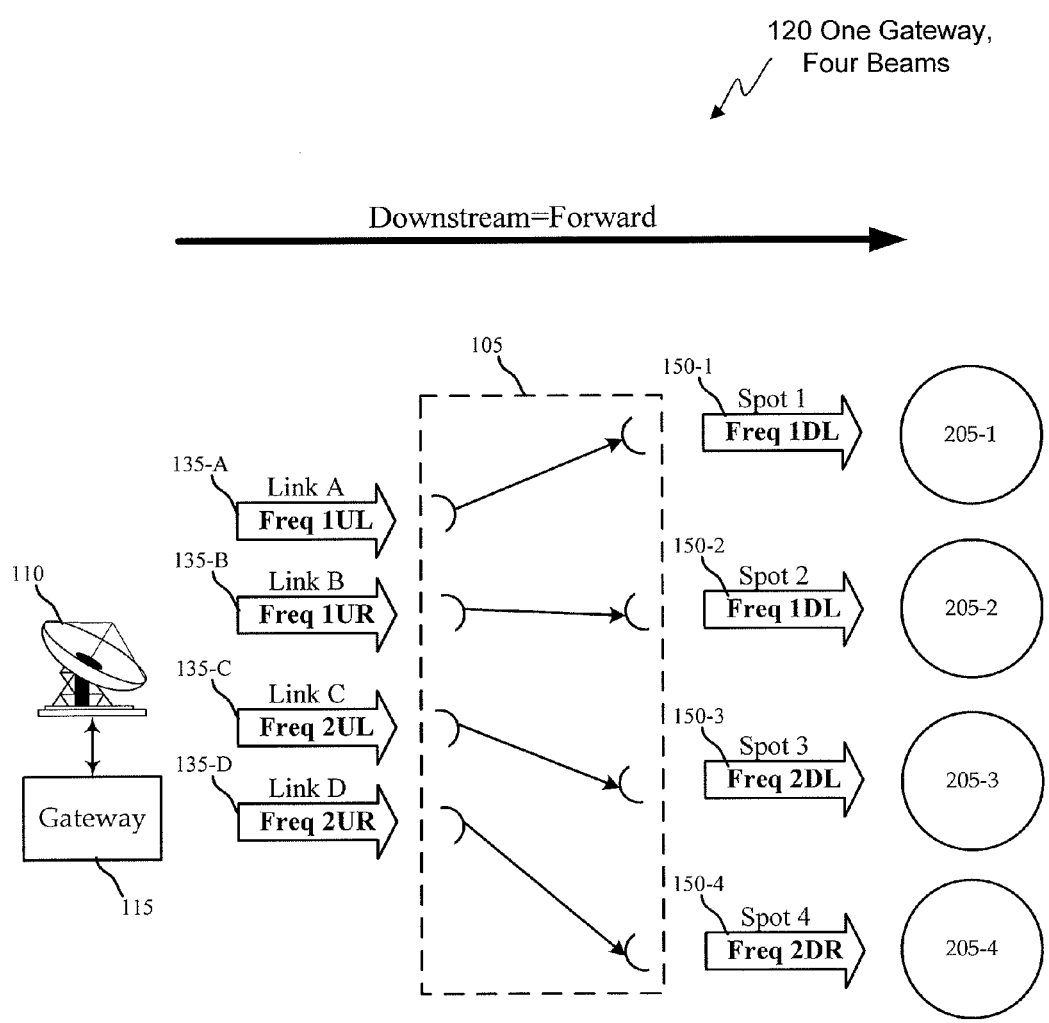
FIG. 12A is an illustration of an embodiment of a forward link distribution system

With reference to FIG. 12A, an embodiment of a forward link distribution system 120 is shown. The gateway 115 is shown coupled to an antenna 110, which generates four downstream signals. A single carrier with 500 MHz of spectrum is used for each of the four downstream uplinks 135A-135D. In this embodiment, a total of two-frequencies and two polarizations allow four separate downstream uplinks 135A-135D while using only 1 GHz of the spectrum. For example, link A 135-A could be Freq 1U (27.5-28.0 GHz) with left-hand polarization, link B 135-B could be Freq 1U (27.5-28.0) GHz with right-hand polarization, link C could be Freq 2U (29.5-30 GHz) with left-hand polarization, and link D could be Freq 2U (29.5-30 GHz) with left-hand polarization.

The satellite 105 is functionally depicted as four "bent pipe" connections between a feeder link and a service link. Carrier signals can be changed through the satellite 105 "bent pipe" connections along with the orientation of polarization. The satellite 105 converts each downstream uplink 135A-D signal into a downstream downlink signal 150-1 to 150-4.

In this embodiment, there are four downstream downlinks 150-1 to 150-4 that each provides a service link for four spot beams 205-1 to 205-4. The downstream downlink 150-1 to 150-4 may change frequency in the bent pipe as is the case in this embodiment. For example, downstream uplink A 135-A changes from a first frequency (i.e., Freq 1U) to a second frequency (i.e., Freq 1D) through the satellite 105. Other embodiments may also change polarization between the uplink and downlink for a given downstream channel. Some embodiments may use the same polarization and/or frequency for both the uplink and downlink for a given downstream channel.

Figure 12B:
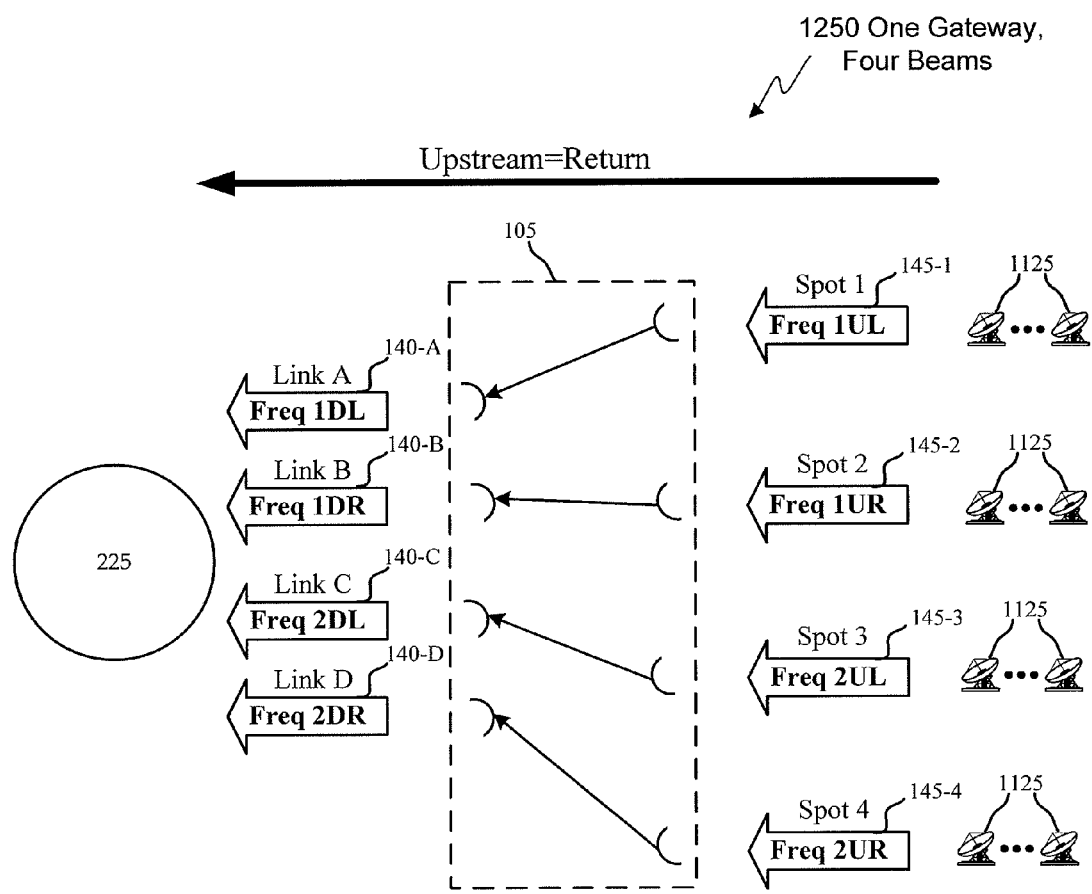
FIG. 12B is an illustration of an embodiment of a return link distribution system is shown.

Referring next to FIG. 12B, an embodiment of a return link distribution system 1250 is shown. This embodiment shows four upstream uplinks 145-1 to 145-4 from four sets of subscriber terminals 1125. A "bent pipe" satellite 105 takes the upstream uplinks 145-1 to 145-4, optionally changes carrier frequency and/or polarization (not shown), and then redirects them as upstream downlinks 140-A to 140-D to a spot beam for a gateway 115. In this embodiment, the carrier frequency changes between the uplink 145-1 to 145-4 and the downlink 140-A to 145-D, but the polarization remains the same. Because the feeder spot beams to the gateway 115 is not in the coverage area of the service beams, the same frequency pairs may be reused for both service links and feeder links.

Figure 13A:
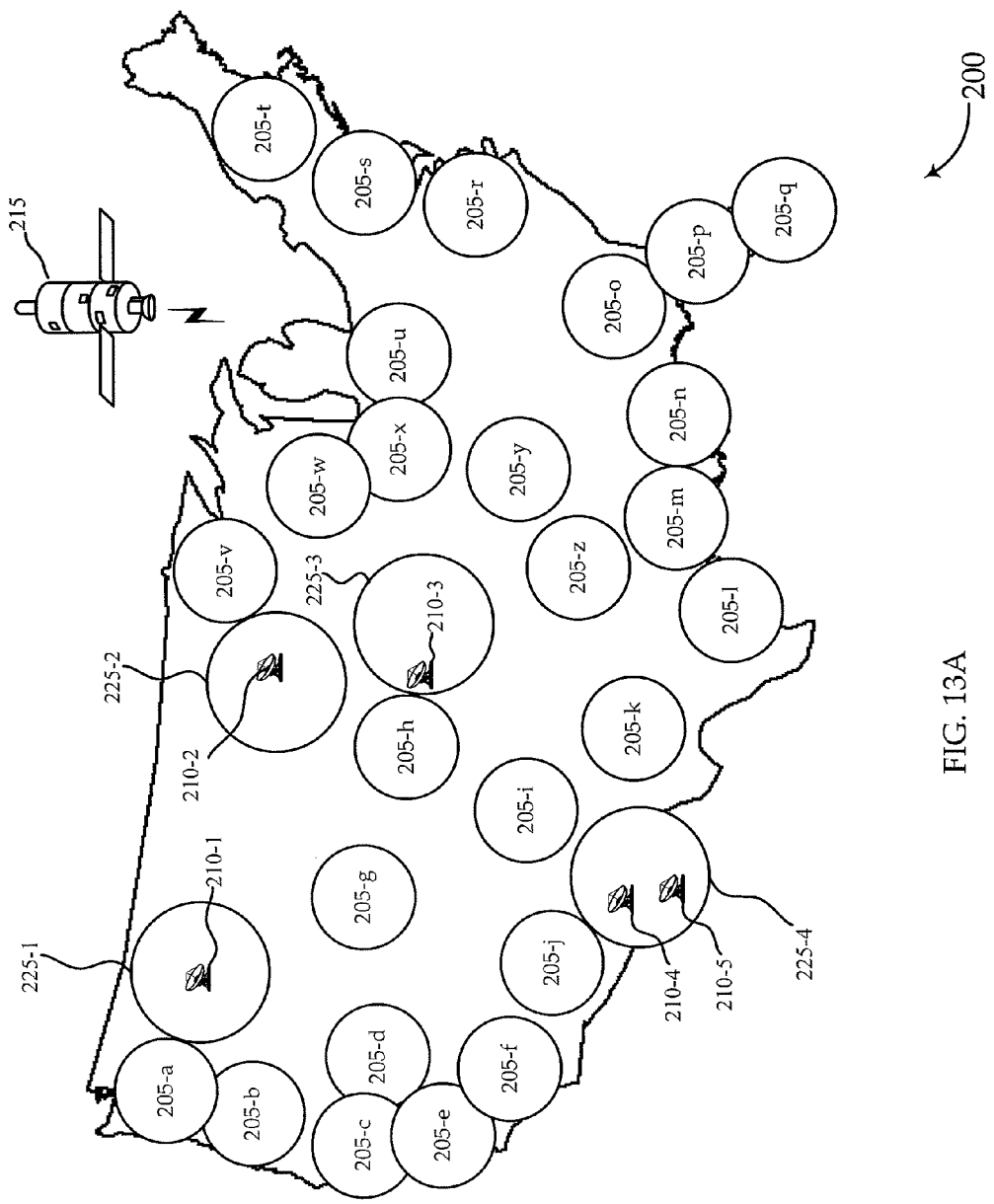
FIG. 13A and 13B are illustration of a multi-beam system configured according to various embodiments of the invention.
Figure 13B:
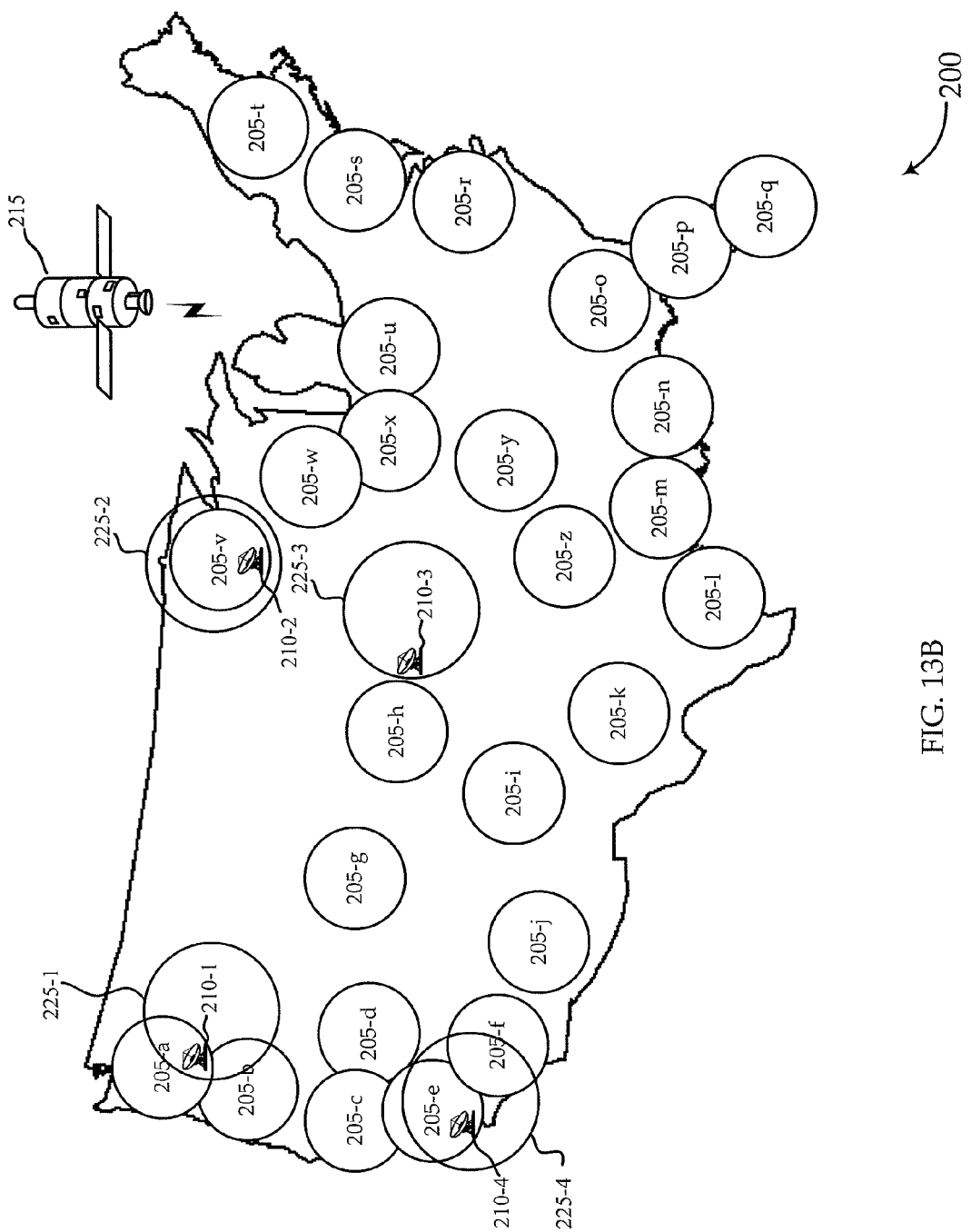

Turning to FIGS. 13A and 13B, examples of a multi-beam system 200 configured according to various embodiments of the invention are shown. The multi-beam system 200 may, for example, be implemented in the network 120 described in FIGS. 11A and 1B. Shown in FIGS. 12A-13B is the coverage of a number of feeder and service spot beam regions 225, 205. In this embodiment, a satellite 215 reuses frequency bands by isolating antenna directivity to certain regions of a country (e.g., United States, Canada or Brazil). As shown in FIG. 13A, there is complete geographic exclusivity between the feeder and service spot beams 205, 225. But that is not the case for FIG. 13B where there may in some instances be service spot beam overlap (e.g., 205-c, 205-d, 205-e), while there is no overlap in other areas. However, with overlap, there are certain interference issues that may inhibit frequency band re-use in the overlapping regions. A four color pattern allows avoiding interference even where there is some overlap between neighboring service beams 205.

In this embodiment, the gateway terminals 210 are also shown along with their feeder beams 225. As shown in FIG. 13B, the gateway terminals 210 may be located in a region covered by a service spotbeam (e.g., the first, second and fourth gateways 210-1, 210-2, 210-4). However, a gateway may also be located outside of a region covered by a service spotbeam (e.g., the third gateway 210-3). By locating gateway terminals 210 outside of the service spotbeam regions (e.g., the third gateway 210-3), geographic separation is achieved to allow for re-use of the allocated frequencies.

There are often spare gateway terminals 210 in a given feeder spot beam 225. The spare gateway terminal 210-5 can substitute for the primary gateway terminal 210-4 should the primary gateway terminal 210-4 fail to function properly. Additionally, the spare can be used when the primary is impaired by weather.

Figure 14:
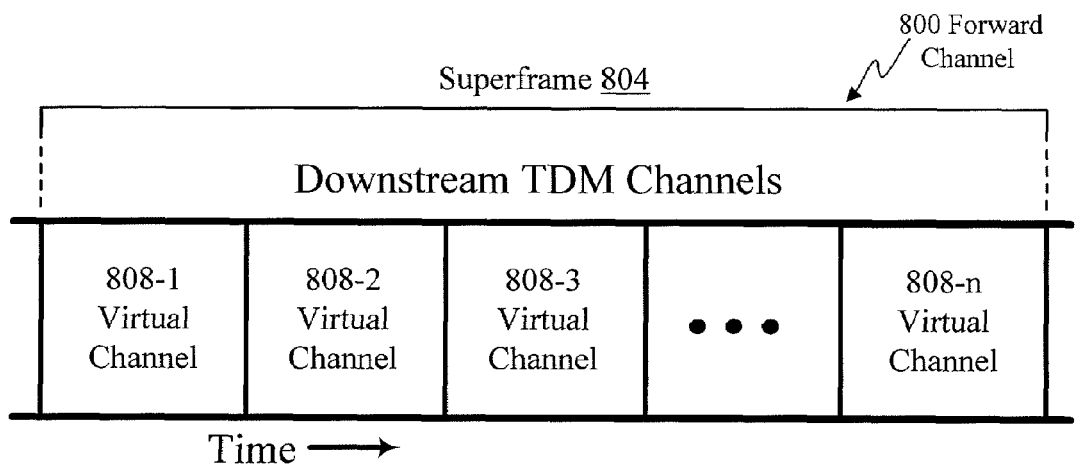
FIG. 14 is an illustration of an embodiment of a downstream channel.

Referring next to FIG. 14, an embodiment of a downstream channel 800 is shown. The downstream channel 800 includes a series of superframes 804 in succession, where each superframe 804 may have the same size or may vary in size. This embodiment divides a superframe 804 into a number of virtual channels 808(1–n). The virtual channels 808(1–n) in each superframe 804 can be the same size or different sizes. The size of the virtual channels 808(1–n) can change between different superframes 804. Different coding can be optionally used for the various virtual channels 808 (1–n). In some embodiments, the virtual channels are as short as one symbol in duration.

Figure 15:
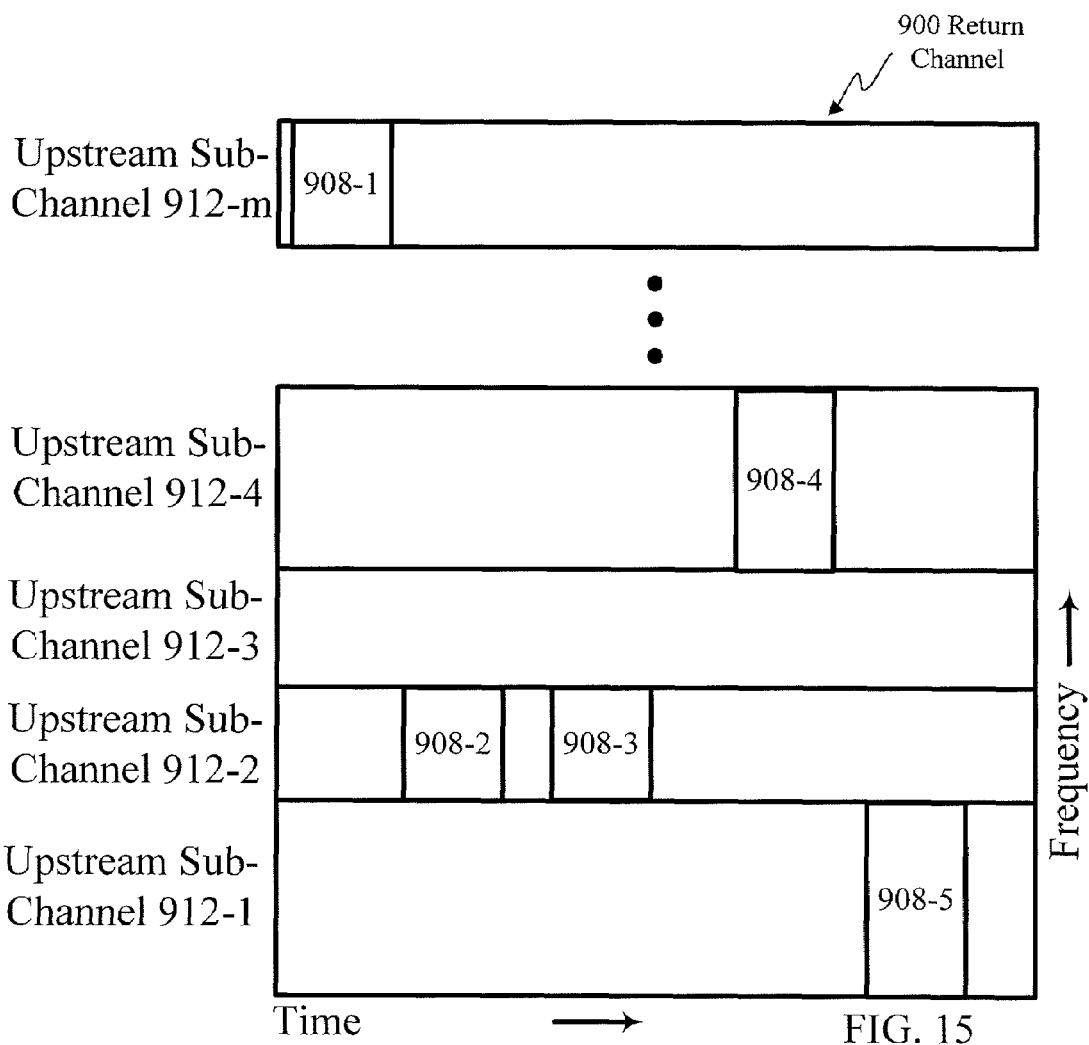
FIG. 15 is an illustration of an embodiment of an upstream channel.

With reference to FIG. 15, an embodiment of an upstream channel 900 is shown. This embodiment uses MF-TDMA, but other embodiments can use CDMA, OFDM, or other access schemes. The upstream channel 900 has 500 MHz of total bandwidth in one embodiment. The total bandwidth is divided into m frequency sub-channels, which may differ in bandwidth, modulation, coding, etc. and may also vary in time based on system needs.

In this embodiment, each subscriber terminal 130 is given a two-dimensional (2D) map to use for its upstream traffic. The 2D map has a number of entries where each indicates a frequency sub-channel 912 and time segment 908(1-5). For example, one subscriber terminal 130 is allocated sub-channel m 912-m, time segment one 908-1; sub-channel two 912-2, time segment two 908-2; sub-channel two 912-2, time segment three 908-3; etc. The 2D map is dynamically adjusted for each subscriber terminal 130 according to anticipated need by a scheduler in the SMTS.

Figure 16:
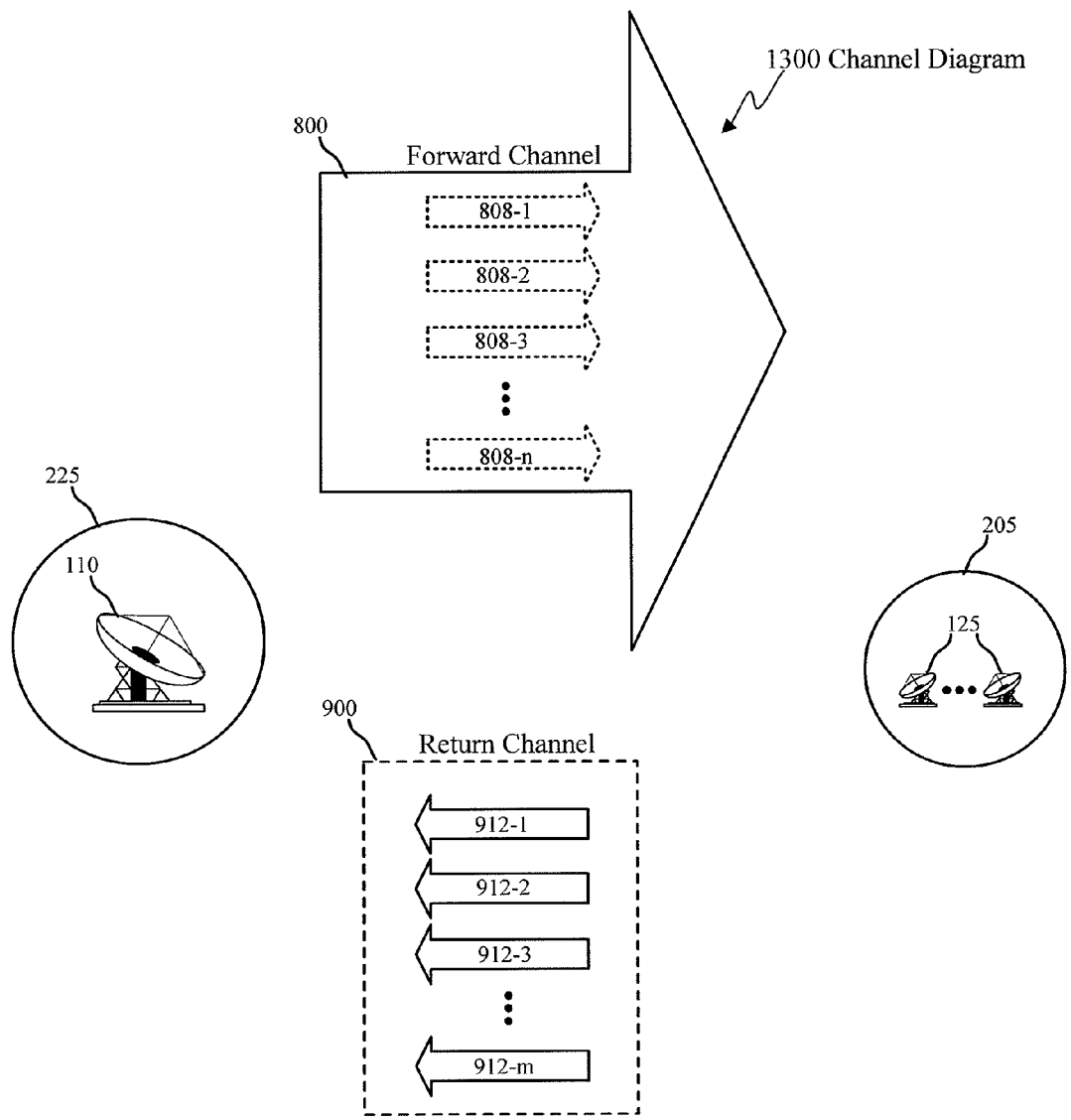
FIG. 16 is an illustration of an embodiment of a channel diagram.

Referring to FIG. 16, an embodiment of a channel diagram is shown. Only the channels for a single feeder spot beam 225 and a single service spot beam 205 are shown, but embodiments include many of each spot beam 225, 205 (e.g., various embodiments could have 60, 80, 100, 120, etc. of each type of spot beam 225, 205). The forward channel 800 includes n virtual channels 808 traveling from the gateway antenna 110 to the service spot beam 205. Each subscriber terminal 130 may be allocated one or more of the virtual channels 808. m MF-TDMA channels 912 make up the return channel 900 between the subscriber terminal (ST) antennas 1125 and the feeder spot beam 225.

Figure 17:
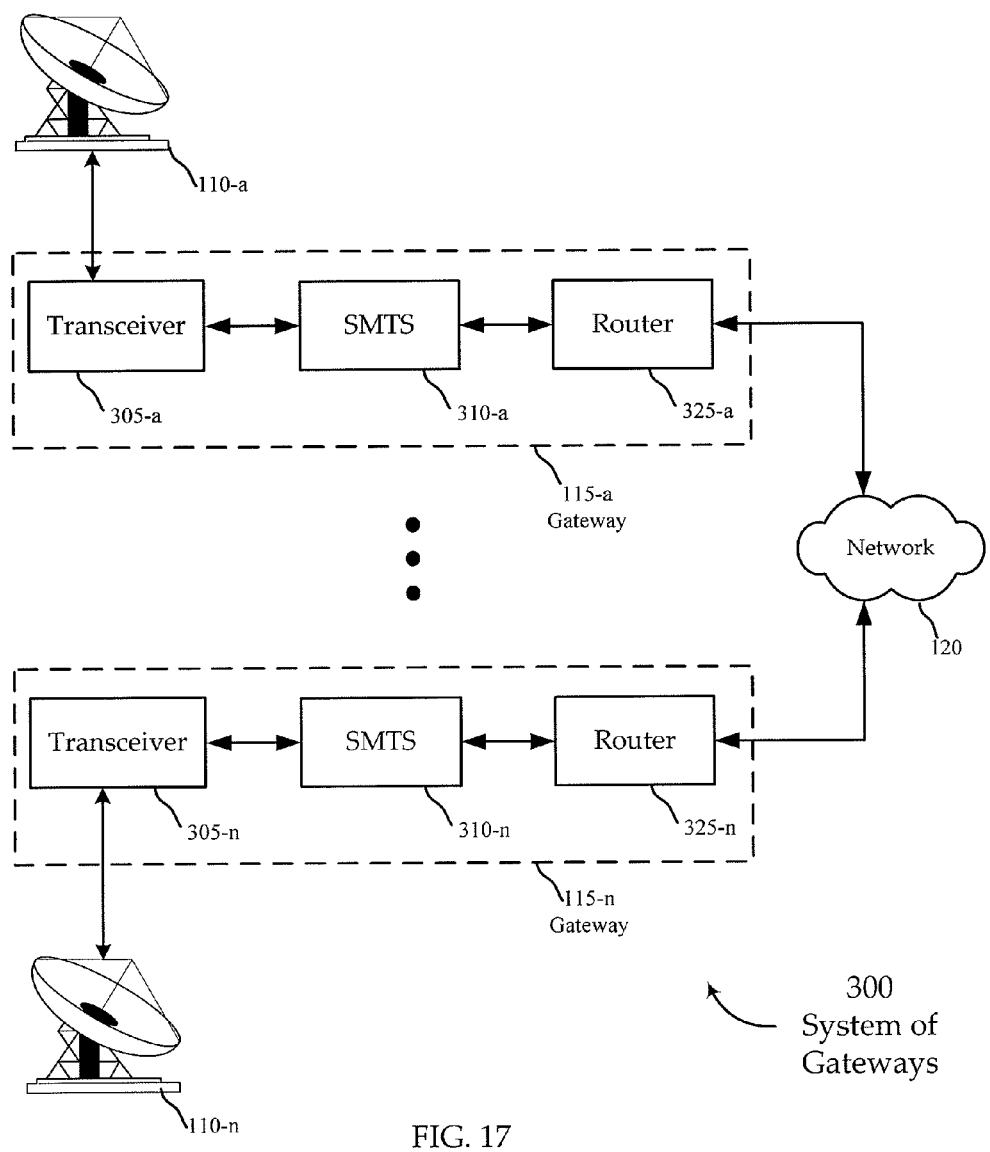
FIG. 17 is an illustration of an embodiment of a ground system of a gateway.

Referring next to FIG. 17, an embodiment of a ground system 300 of gateways 115a-n is shown in block diagram form. One embodiment could have fifteen active gateways 115a-n (and possibly spares) to generate sixty service spot beams, for example. The ground system 300 includes a number of gateways 115a-n respectively coupled to antennas 110a-n. All the gateways 115a-n are coupled to a network 120 such as the Internet. The network is used to gather information for the subscriber terminals. Additionally, each SMTS communicates with other SMTS and the Internet using the network 120 or other means not shown.

Each gateway 115a-n includes a transceiver 305, a SMTS 310 and a router 325. The transceiver 305 includes both a transmitter and a receiver. In this embodiment, the transmitter takes a baseband signal and upconverts and amplifies the baseband signal for transmission of the downstream uplinks 135 with the antenna 110a-n. The receiver downconverts and tunes the upstream downlinks 140 along with other processing as explained below. The SMTS 310 processes signals to allow the subscriber terminals to request and receive information and schedules bandwidth for the forward and return channels 800, 900. Additionally, the SMTS 310 provides configuration information and receives status from the subscriber terminals 130. Any requested or returned information is forwarded via the router 325.

Figure 18:
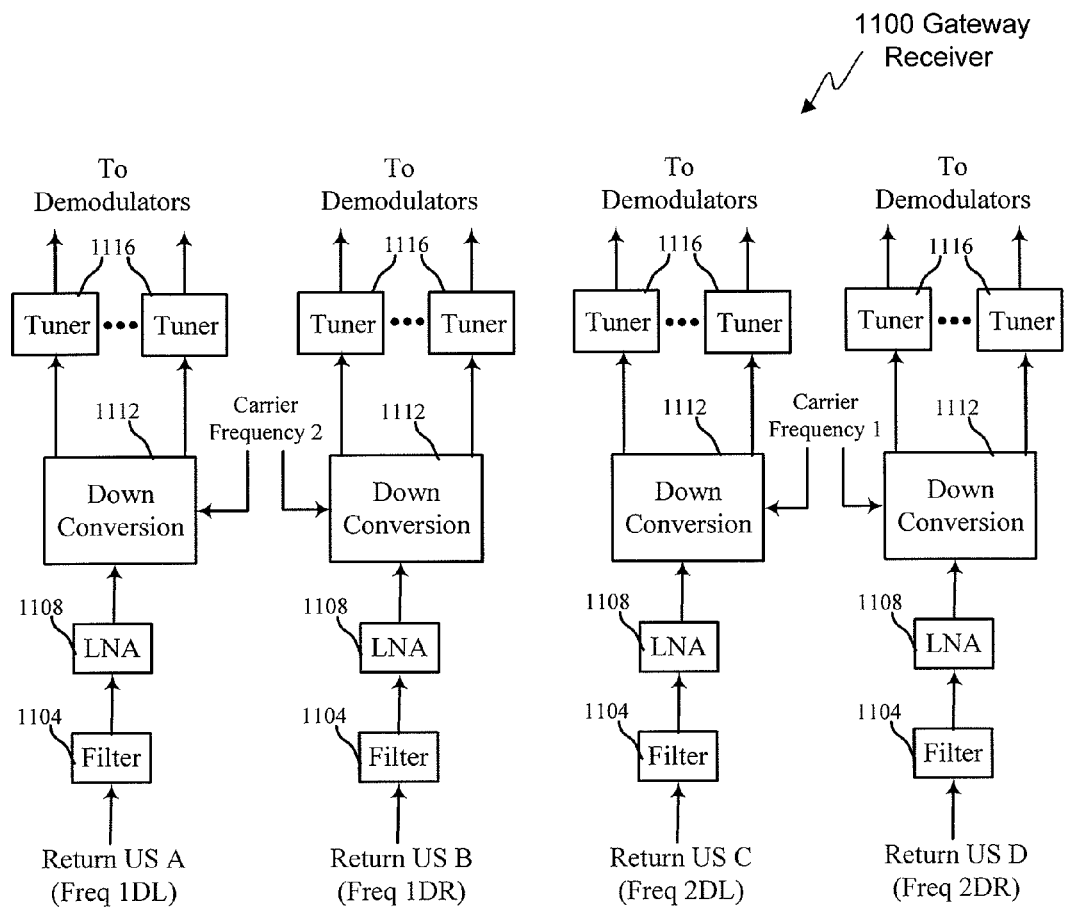
FIG. 18 is an illustration of an embodiment of a gateway receiver.

With reference to FIG. 18, an embodiment of gateway receiver 100 is shown. This embodiment of the receiver 1100 processes four return channels 900 from four different service spot beams 205. The return channels 900 may be divided among four pathways using antenna polarization and/or filtering 1104. Each return channel is coupled to a low-noise amplifier (LNA) 1108. Down conversion 1112 mixes down the signal into its intermediate frequency. Each of the upstream sub-channels 912 is separated from the signal by a number of tuners 116. Further processing is performed in the SMTS 310.

Figure 19:
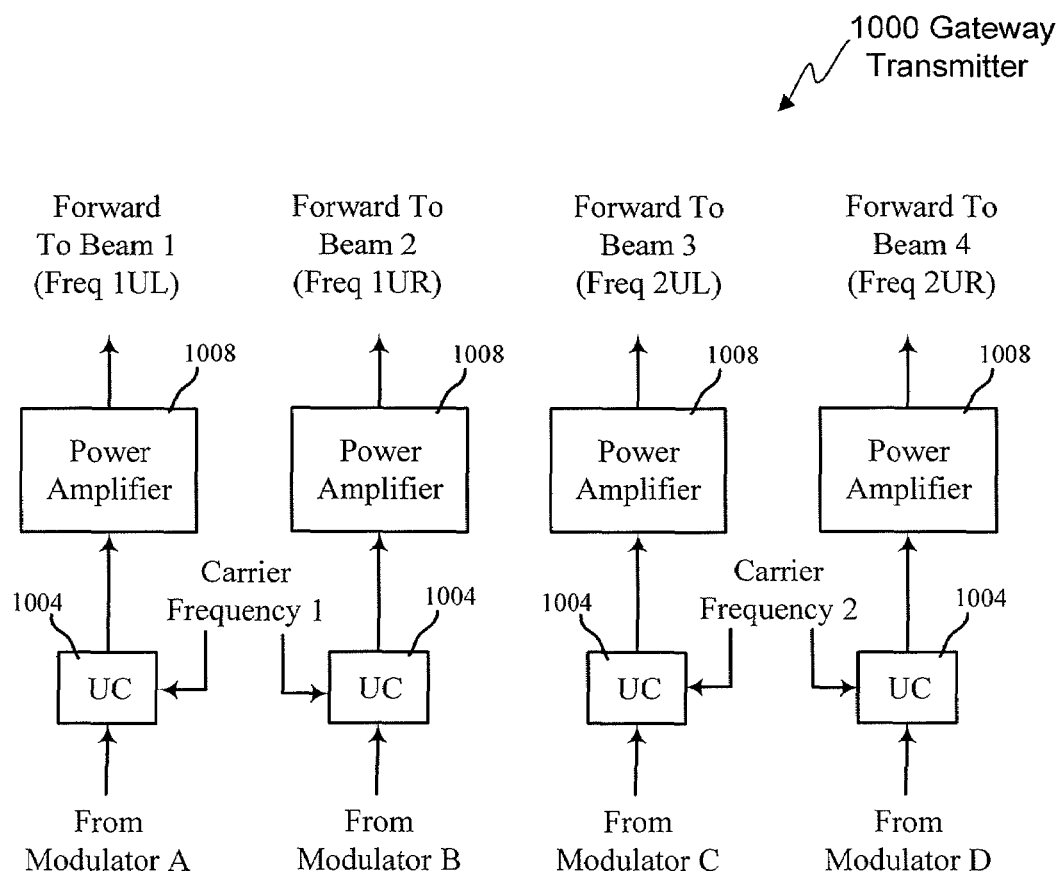
FIG. 19 is an illustration of an embodiment of a gateway transmitter.
Figure 20:
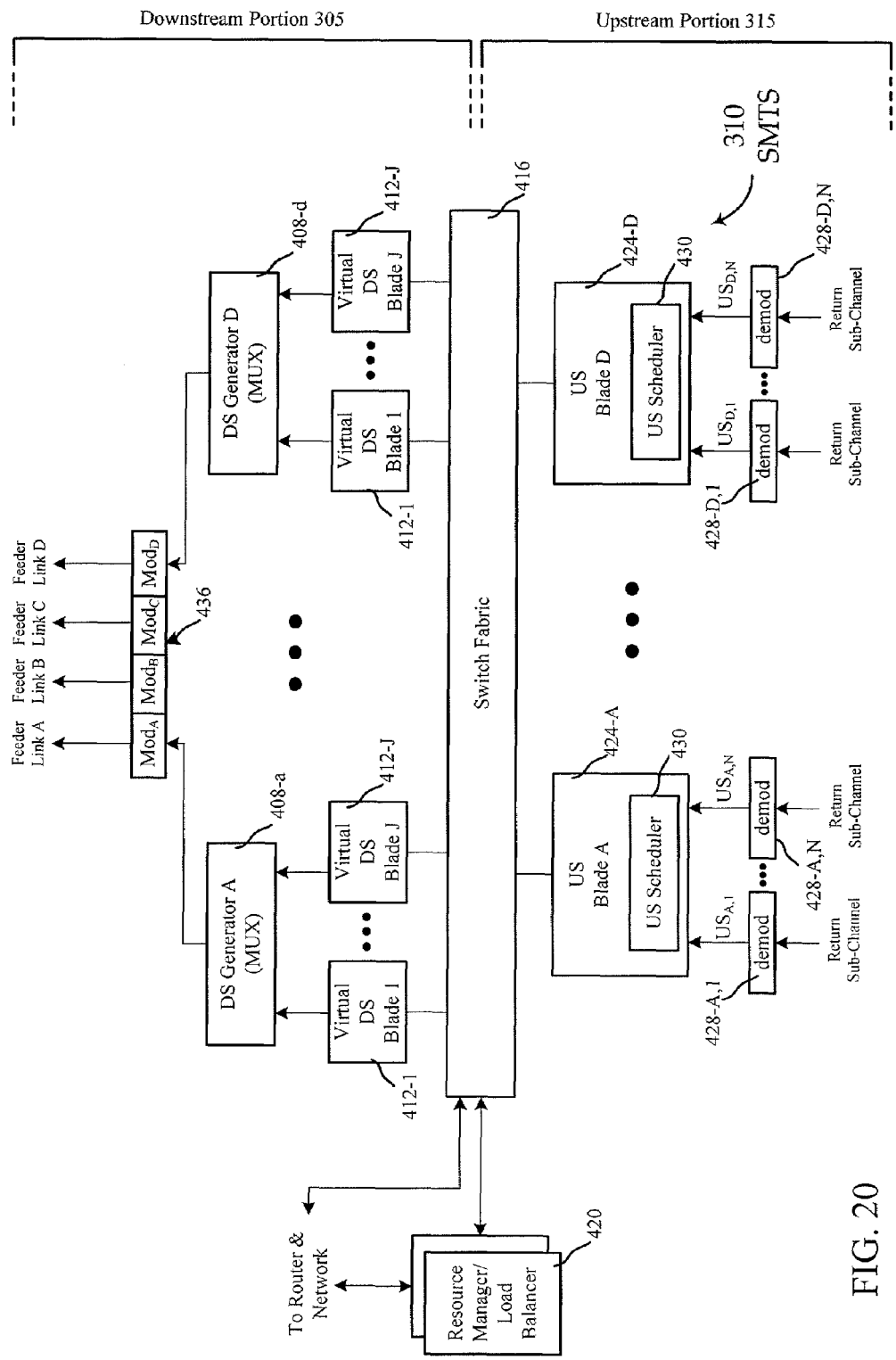
FIG. 20 is a block diagram of an embodiment of a SMTS.

Referring next to FIG. 19, an embodiment of a gateway transmitter 1000 is shown. The downstream channels 800 are received at their intermediate frequencies from the SMTS 310. With separate pathways, each downstream channel 800 is up-converted 1004 using two different carrier frequencies. A power amplifier 1008 increases the amplitude of the forward channel 900 before coupling to the antenna. The antenna polarizes the separate signals to keep the four forward channels 800 distinct as they are passed to the satellite.

With reference to FIG. 204, an embodiment of a SMTS 310 is shown in block diagram form. Baseband processing is done for the inbound and outbound links by a number of geographically separated gateways. Each SMTS 310 is generally divided into two sections, specifically, the downstream portion 305 to send information to the satellite and the upstream portion 315 to receive information from the satellite 105.

The downstream portion 305 takes information from the switching fabric 416 through a number of downstream (DS) blades 412. The DS blades 412 are divided among a number of downstream generators 408. This embodiment includes four downstream generators 408, with one for each of the downstream channels 800. For example, this embodiment uses four separate 500 MHz spectrum ranges having different frequencies and/or polarizations. A four-color modulator 436 has a modulator for each respective DS generator 408. The modulated signals are coupled to the transmitter portion 1000 of the transceiver 305 at an intermediate frequency. Each of the four downstream generators 408 in this embodiment has J virtual DS blades 412.

The upstream portion 315 of the SMTS 310 receives and processes information from the satellite 105 in the baseband intermediate frequency. After the receiver portion 1100 of the transceiver 305 produces all the sub-channels 912 for the four separate baseband upstream signals, each sub-channel 912 is coupled to a different demodulator 428. Some embodiments could include a switch before the demodulators 428 to allow any return link sub-channel 912 to go to any demodulator 428 to allow dynamic reassignment between the four return channels 908. A number of demodulators are dedicated to an upstream (US) blade 424.

The US blades 424 serve to recover the information received from the satellite 105 before providing it to the switching fabric 416. The US scheduler 430 on each US blade 424 serves to schedule use of the return channel 900 for each subscriber terminal 130. Future needs for the subscriber terminals 130 of a particular return channel 900 can be assessed and bandwidth/latency adjusted accordingly in cooperation with the Resource Manager and Load Balancer (RM/LB) block 420.

The RM/LB block 420 assigns traffic among the US and DS blades. By communication with other RM/LB blocks 420 in other SMTSes 310, each RM/LB block 420 can reassign subscriber terminals 130 and channels 800, 900 to other gateways. This reassignment can take place for any number of reasons, for example, lack of resources and/or loading concerns. In this embodiment, the decisions are done in a distributed fashion among the RM/LB blocks 420, but other embodiments could have decisions made by one master MR/LB block or at some other central decision-making authority. Reassignment of subscriber terminals 130 could use overlapping service spot beams 205, for example.

Figure 21:
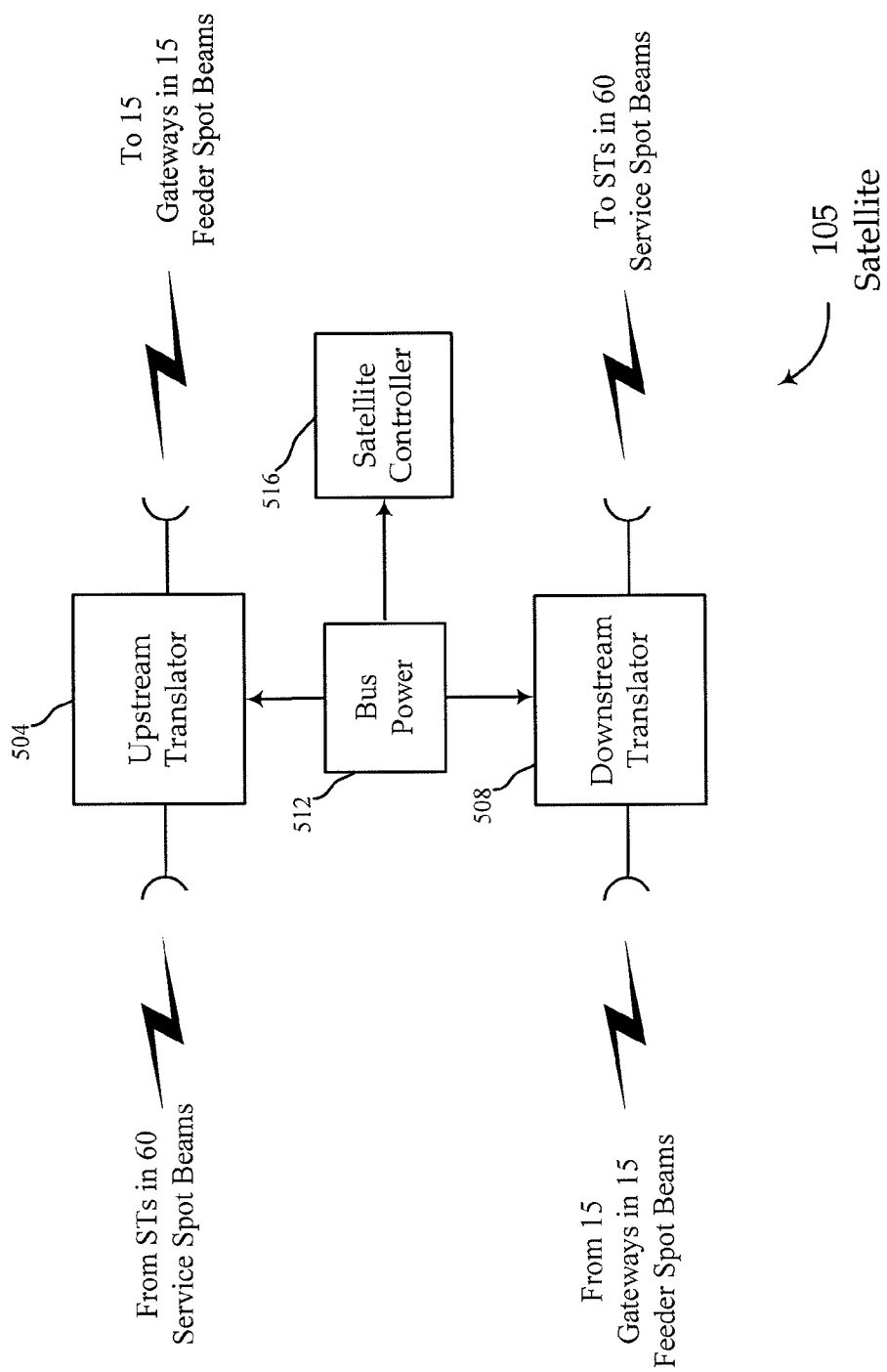
FIG. 21 is a block diagram of an embodiment of a satellite.

Referring next to FIG. 21, an embodiment of a satellite 105 is shown in block diagram form. The satellite 105 in this embodiment communicates with fifteen gateways 115 and all STs 130 using sixty feeder and service spot beams 225, 205. Other embodiments could use more or less gateways/spot beams. Bus power 512 is supplied using a power source such as chemical fuel, nuclear fuel and/or solar energy. A satellite controller 516 is used to maintain attitude and otherwise control the satellite 105. Software updates to the satellite 105 can be uploaded from the gateway 115 and performed by the satellite controller 516.

Information passes in two directions through the satellite 105. A downstream translator 508 receives information from the fifteen gateways 115 for relay to subscriber terminals 130 using sixty service spot beams 205. An upstream translator 504 receives information from the subscriber terminals 130 occupying the sixty spot beam areas and relays that information to the fifteen gateways 115. This embodiment of the satellite can switch carrier frequencies in the downstream or upstream processors 508, 504 in a "bent-pipe" configuration, but other embodiments could do baseband switching between the various forward and return channels 800, 900. The frequencies and polarization for each spot beam 225, 205 could be programmable or preconfigured.

Figure 22:
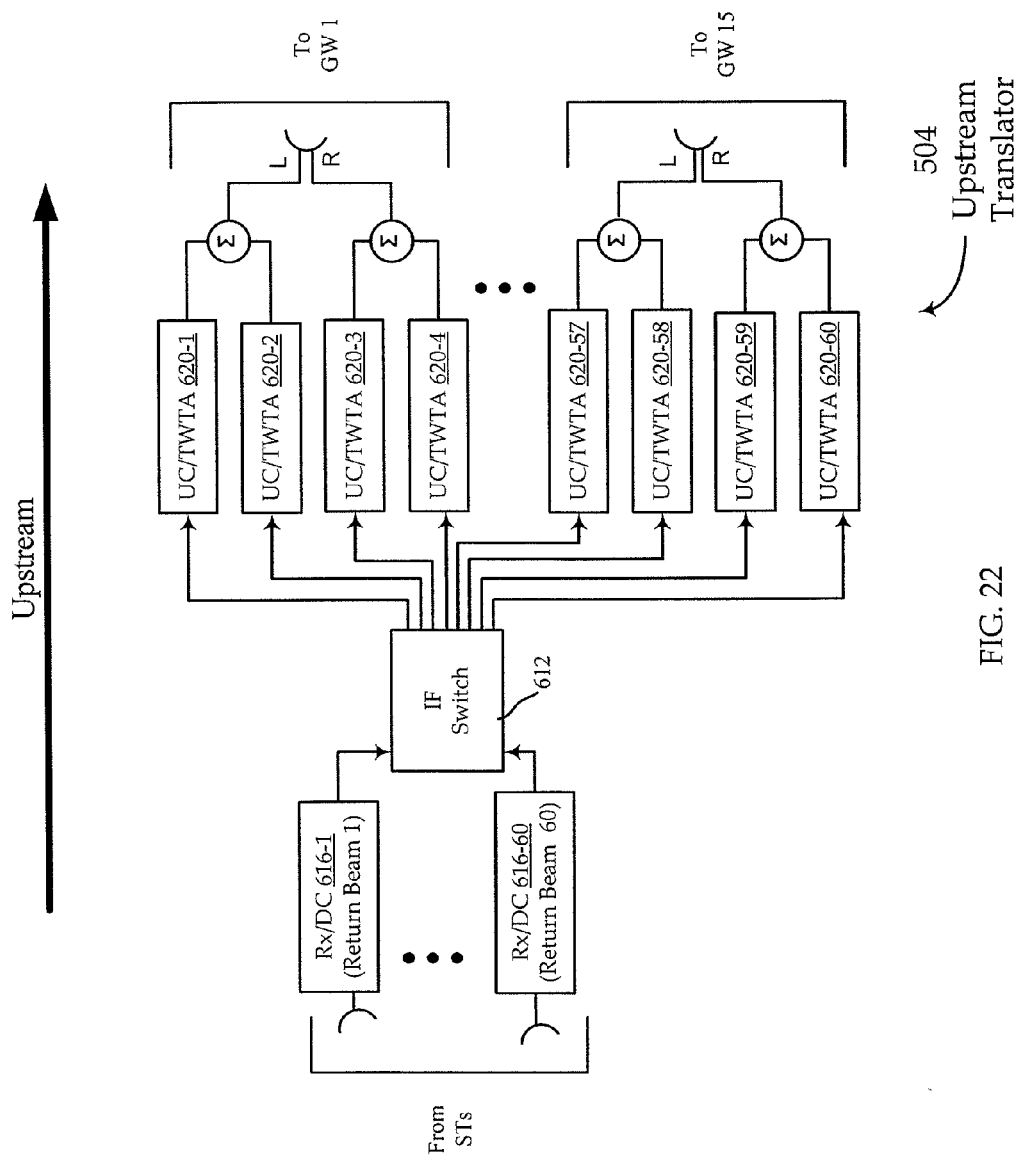
FIG. 22 is a block diagram of an embodiment of an upstream translator.

With reference to FIG. 22, an embodiment of an upstream translator 504 is shown in block diagram form. A Receiver and Downconverter (Rx/DC) block 616 receives all the return link information for the area defined by a spot beam 205 as an analog signal before conversion to an intermediate frequency (IF). There is a Rx/DC block 616 for each service spot beam area 205. An IF switch 612 routes a particular baseband signal from a Rx/DC block 616 to a particular upstream downlink channel. The upstream downlink channel is filled using an Upconverter and Traveling Wave Tube Amplifier (UC/TWTA) block 620. The frequency and/or polarization can be changed through this process such that each upstream channel passes through the satellite 105 in a bent pipe fashion.

Each gateway 115 has four dedicated UC/TWTA blocks 620 in the upstream translator 504. Two of the four dedicated UC/TWTA blocks 620 operate at a first frequency range and two operate at a second frequency range in this embodiment. Additionally, two use right-hand polarization and two use left-hand polarization. Between the two polarizations and two frequencies, the satellite 105 can communicate with each gateway 115 with four separate upstream downlink channels.

Figure 23:
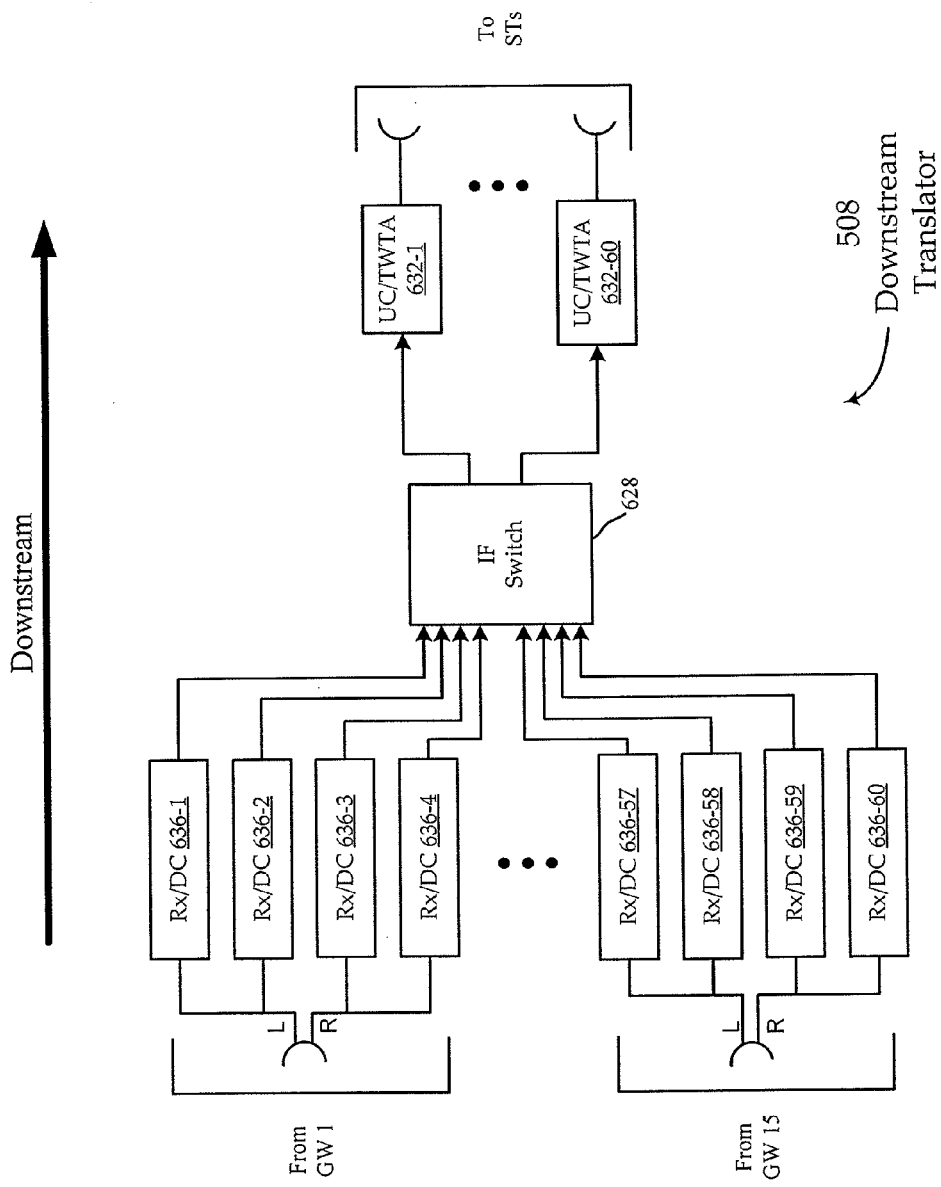
FIG. 23 is a block diagram of an embodiment of a downstream translator.

Referring next to FIG. 23, an embodiment of a downstream translator 508 is shown as a block diagram. Each gateway 115 has four downstream uplink channels to the satellite 105 by use of two frequency ranges and two polarizations. A Rx/DC block 636 takes the analog signal and converts the signal to an intermediate frequency. There is a Rx/DC block 636 for all sixty downstream uplink channels from the fifteen gateways 115. The IF switch 612 connects a particular channel 800 from a gateway 115 to a particular service spot beam 205. Each IF signal from the switch 628 is modulated and amplified with a UC/TWTA block 632. An antenna broadcasts the signal using a spot beam to subscriber terminals 130 that occupy the area of the spot beam. Just as with the upstream translator 504, the downstream translator 508 can change carrier frequency and polarization of a particular downstream channel in a bent-pipe fashion.

Figure 24:
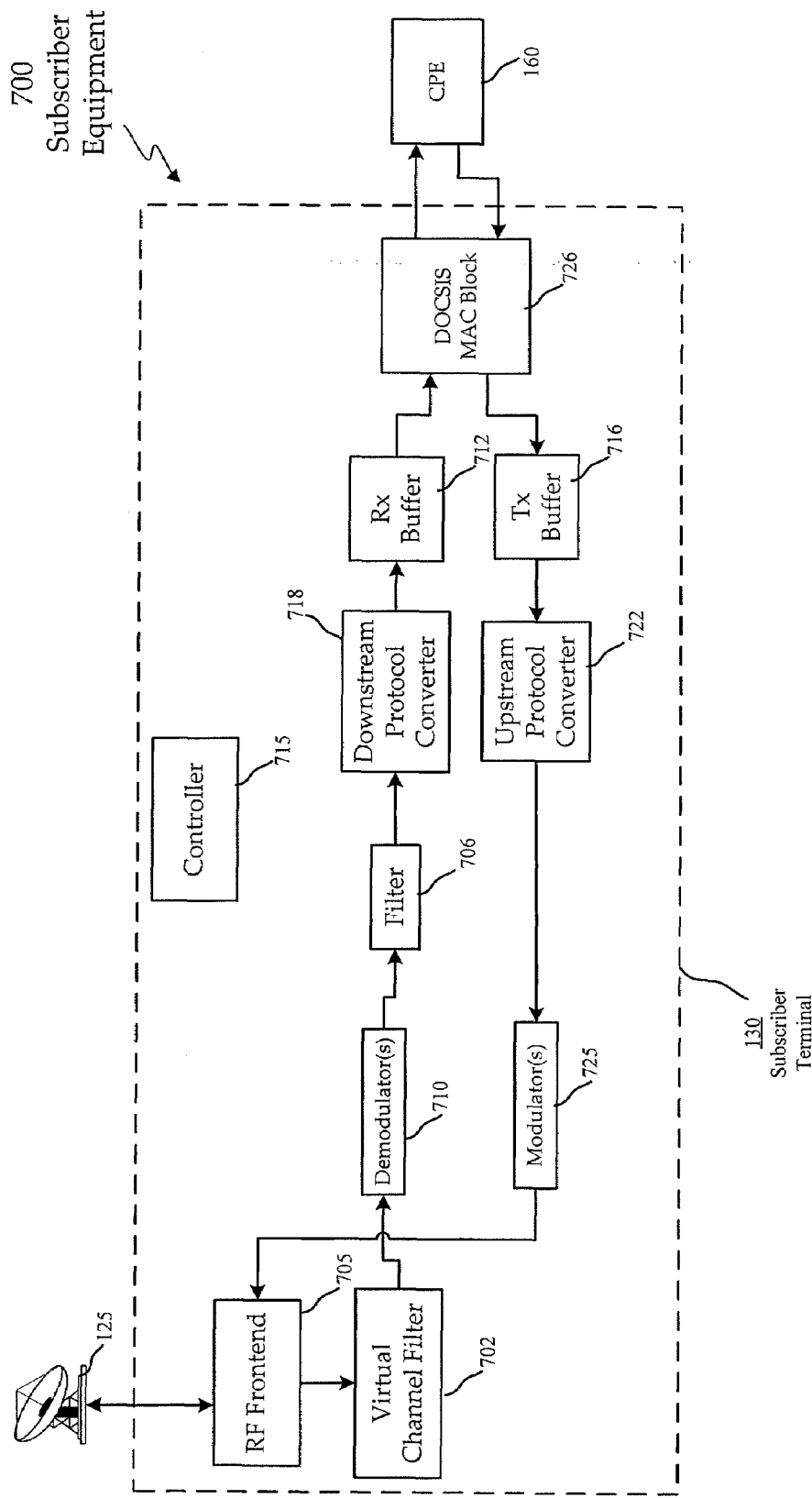
FIG. 24 is a block diagram illustrating a set of subscriber equipment which may be located at a subscriber location.

FIG. 24 comprises a block diagram illustrating a set of subscriber equipment 700 which may be located at a subscriber location for the reception and transmission of communication signals. Components of this set of subscriber equipment 700 may, for example, comprise the antenna 125, associated subscriber terminal 130 and any consumer premises equipment (CPE) 160, which may be a computer, a network, etc.

An antenna 125 may receive signals from a satellite 105. The antenna 125 may comprise a VSAT antenna, or any of a variety other antenna types (e.g., other parabolic antennas, microstrip antennas, or helical antennas). In some embodiments, the antenna 125 may be configured to dynamically modify its configuration to better receive signals at certain frequency ranges or from certain locations. From the antenna 125, the signals are forwarded (perhaps after some form of processing) to the subscriber terminal 130. The subscriber terminal 130 may include a radio frequency (RF) frontend 705, a controller 715, a virtual channel filter 702, a modulator 725, a demodulator 710, a filter 706, a downstream protocol converter 718, an upstream protocol converter 722, a receive (Rx) buffer 712, and a transmit (Tx) buffer 716.

In this embodiment, the RF frontend 705 has both transmit and receive functions. The receive function includes amplification of the received signals (e.g., with a low noise amplifier (LNA)). This amplified signal is then downconverted (e.g., using a mixer to combine it with a signal from a local oscillator (LO)). This downconverted signal may be amplified again with the RF frontend 705, before processing of the superframe 804 with the virtual channel filter 702. A subset of each superframe 804 is culled from the downstream channel 800 by the virtual channel filter 702, for example, one or more virtual channels 808 are filtered off for further processing.

A variety of modulation and coding techniques may be used at the subscriber terminal 130 for signals received from and transmitted to a satellite. In this embodiment, modulation techniques include BPSK, QPSK, 8PSK, 16APSK, 32PSK. In other embodiments, additional modulation techniques may include ASK, FSK, MFSK, and QAM, as well as a variety of analog techniques. The demodulator 710 may demodulate the down-converted signals, forwarding the demodulated virtual channel 808 to a filter 706 to strip out the data intended for the particular subscriber terminal 130 from other information in the virtual channel 808.

Once the information destined for the particular subscriber terminal 130 is isolated, a downstream protocol converter 718 translates the protocol used for the satellite link into one that the DOCSIS MAC block 726 uses. Alternative embodiments could use a WiMAX MAC block or a combination DOCSIS/WiMAX block. A Rx buffer 712 is used to convert the high-speed received burst into a lower-speed stream that the DOCSIS MAC block 726 can process. The DOCSIS MAC block 726 is a circuit that receives a DOCSIS stream and manages it for the CPE 160. Tasks such as provisioning, bandwidth management, access control, quality of service, etc. are managed by the DOCSIS MAC block 726. The CPE can often interface with the DOCSIS MAC block 726 using Ethernet, WiFi, USB and/or other standard interfaces. In some embodiments, a WiMax block 726 could be used instead of a DOCSIS MAC block 726 to allow use of the WiMax protocol.

It is also worth noting that while a downstream protocol converter 718 and upstream protocol converter 722 may be used to convert received packets to DOCSIS or WiMax compatible frames for processing by a MAC block 726, these converters will not be necessary in many embodiments. For example, in embodiments where DOCSIS or WiMax based components are not used, the protocol used for the satellite link may also be compatible with the MAC block 726 without such conversions, and the converters 718, 722 may therefore be excluded.

Various functions of the subscriber terminal 130 are managed by the controller 715. The controller 715 may oversee a variety of decoding, interleaving, decryption, and unscrambling techniques, as known in the art. The controller may also manage the functions applicable to the signals and exchange of processed data with one or more CPEs 160. The CPE 160 may comprise one or more user terminals, such as personal computers, laptops, or any other computing devices as known in the art.

The controller 715, along with the other components of the subscriber terminal 130, may be implemented in one or more Application Specific Integrated Circuits (ASICs), or a general purpose processor adapted to perform the applicable functions. Alternatively, the functions of the subscriber terminal 130 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The controller may be programmed to access memory unit (not shown). It may fetch instructions and other data from the memory unit, or write data to the memory-unit.

As noted above, data may also be transmitted from the CPE 160 through the subscriber terminal 130 and up to a satellite 105 in various communication signals. The CPE 160, therefore, may transmit data to DOCSIS MAC block 726 for conversion to the DOCSIS protocol before that protocol is translated with an upstream protocol converter 722. The slow-rate data waits in the Tx buffer 716 until it is burst over the satellite link.

The processed data is then transmitted from the Tx buffer 716 to the modulator 725, where it is modulated using one of the techniques described above. In some embodiments, adaptive or variable coding and modulation techniques may be used in these transmissions. Specifically, different modulation and coding combinations, or "modcodes," may be used for different packets, depending on the signal quality metrics from the antenna 125 to the satellite 105. Other factors, such as network and satellite congestion issues, may be factored into the determination, as well. Signal quality information may be received from the satellite or other sources, and various decisions regarding modcode applicability may be made locally at the controller, or remotely. The RF frontend 705 may then amplify and upconvert the modulated signals for transmission through the antenna 125 to the satellite.

The invention has been explained with reference to specific embodiments. Other embodiments will be evident to those of ordinary skill in the art. For example, while the invention has been explained with reference to operation where traffic through a hub is measured, the invention has broader applications. Therefore it is not intended that the invention be limited, except as indicated by the appended claims.

Appendix A Very High-Speed Broadband Satellite Communication

The following information is given as background in order to understand the environment of high-speed satellite communication, particularly as employed to service subscribers accessing high speed networks.

FIG. 1A is a block diagram of an exemplary satellite communications system 100 configured according to various embodiments of the invention. The satellite communications system 100 includes a network 120, such as the Internet, interfaced with a gateway 115 that is configured to communicate with one or more subscriber terminals 130, via a satellite 105. A gateway 115 is sometimes referred to as a hub or ground station. Subscriber terminals 130 are sometimes called modems, satellite modems or user terminals. As noted above, although the communications system 100 is illustrated as a geostationary satellite 105 based communication system, it should be noted that various embodiments described herein are not limited to use in geostationary satellite based systems, for example some embodiments could be low earth orbit (LEO) satellite based systems.

The network 120 may be any type of network and can include, for example, the Internet, an IP network, an intranet, a wide-area network ("WAN"), a local-area network ("LAN"), a virtual private network, the Public Switched Telephone Network ("PSTN"), and/or any other type of network supporting data communication between devices described herein, in different embodiments. A network 120 may include both wired and wireless connections, including optical links. Many other examples are possible and apparent to those skilled in the art in light of this disclosure. As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals) directed to a destination in the network 120, and can format the received signals for transmission along the network 120.

A device (not shown) connected to the network 120 may communicate with one or more subscriber terminals, and through the gateway 115. Data and information, for example IP datagrams, may be sent from a device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 and WiMAX standards. The link 135 from the gateway 115 to the satellite 105 may be referred to hereinafter as the downstream uplink 135.

The gateway 115 may use an antenna 110 to transmit the signal to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception of such signals. The satellite 105 may process the signals received from the gateway 115 and forward the signal from the gateway 115 containing the MAC frame to one or more subscriber terminals 130. In one embodiment, the satellite 105 operates in a multi-beam mode, transmitting a number of narrow beams each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), or any number of hybrid or other schemes known in the art.

A subscriber terminal, for example 130-a, may transmit data and information to a network 120 destination via the satellite 105. The subscriber terminal 130 transmits the signals via the upstream uplink 145-a to the satellite 105 using the antenna 125-a. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The link from the satellite 105 to the gateway 115 may be referred to hereinafter as the upstream downlink 140.

Turning to FIG. 1B, a block diagram is shown illustrating an alternative embodiment of a satellite communication system 100. This communication system 100 may, for example, comprise the system 100 of FIG. 1A, but is in this instance described with greater particularity. In this embodiment, the gateway 115 includes a Satellite Modem Termination System (SMTS), which is based at least in part on the Data-Over-Cable Service Interface Standard (DOCSIS). The SMTS in this embodiment includes a bank of modulators and demodulators for transmitting signals to and receiving signals from subscriber terminals 130. The SMTS in the gateway 115 performs the real-time scheduling of the signal traffic through the satellite 105, and provides the interfaces for the connection to the network 120. In this embodiment, the subscriber terminals 135 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) is used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a minimum number of space hardware elements. Spotbeam size and TWTA power may be optimized to achieve maximum flux density on the earth's surface of −118 decibel-watts per meter squared per megahertz (dbW/m$^2$/MHz). Thus, using approximately 2 bits per second per hertz (bits/s/Hz), there is approximately 1 Gbps of available bandwidth per spot beam.

With reference to FIG. 12A, an embodiment of a forward link distribution system 1200 is shown. The gateway 115 is shown coupled to an antenna 110, which generates four downstream signals. A single carrier with 500 MHz of spectrum is used for each of the four downstream uplinks 135. In this embodiment, a total of two-frequencies and two polarizations allow four separate downstream uplinks 135 while using only 1 GHz of the spectrum. For example, link A 135-A could be Freq 1U (27.5-28.0 GHz) with left-hand polarization, link B 135-B could be Freq 1U (27.5-28.0) GHz with right-hand polarization, link C could be Freq 2U (29.5-30 GHz) with left-hand polarization, and link D could be Freq 2U (29.5-30 GHz) with left-hand polarization.

The satellite 105 is functionally depicted as four "bent pipe" connections between a feeder and service link. Carrier signals can be changed through the satellite 105 "bent pipe" connections along with the orientation of polarization. The satellite 105 converts each downstream uplink 135 signal into a downstream downlink signal 150.

In this embodiment, there are four downstream downlinks 150 that each provides a service link for four spot beams 205. The downstream downlink 150 may change frequency in the bent pipe as is the case in this embodiment. For example, downstream uplink A 135-A changes from a first frequency (i.e., Freq 1U) to a second frequency (i.e., Freq 1D) through the satellite 105. Other embodiments may also change polarization between the uplink and downlink for a given downstream channel. Some embodiments may use the same polarization and/or frequency for both the uplink and downlink for a given downstream channel.

Referring next to FIG. 12B, an embodiment of a return link distribution system is shown. This embodiment shows four upstream uplinks 145 from four sets of subscriber terminals 125. A "bent pipe" satellite 105 takes the upstream uplinks 145, optionally changes carrier frequency and/or polarization (not shown), and then redirects them as upstream downlinks 140 to a spot beam for a gateway 115. In this embodiment, the carrier frequency changes between the uplink 145 and the downlink 140, but the polarization remains the same. Because the feeder spot beams to the gateway 115 is not in the coverage area of the service beams, the same frequency pairs may be reused for both service links and feeder links.

Turning to FIGS. 2A and 2B, examples of a multi-beam system 200 configured according to various embodiments of the invention are shown. The multi-beam system 200 may, for example, be implemented in the network 100 described in FIGS. 1A and 1B. Shown are the coverage of a number of feeder and service spot beam regions 225, 205. In this embodiment, a satellite 215 reuses frequency bands by isolating antenna directivity to certain regions of a country (e.g., United States, Canada or Brazil). As shown in FIG. 2A, there is complete geographic exclusivity between the feeder and service spot beams 205, 225. But that is not the case for FIG. 2B where there may in some instances be service spot beam overlap (e.g., 205-c, 205-d, 205-e), while there is no overlap in other areas. However, with overlap, there are certain interference issues that may inhibit frequency band re-use in the overlapping regions. A four color pattern allows avoiding interference even where there is some overlap between neighboring service beams 205.

In this embodiment, the gateway terminals 210 are also shown along with their feeder beams 225. As shown in FIG. 2B, the gateway terminals 210 may be located in a region covered by a service spotbeam (e.g., the first, second and fourth gateways 210-1, 210-2, 210-4). However, a gateway may also be located outside of a region covered by a service spotbeam (e.g., the third gateway 210-3). By locating gateway terminals 210 outside of the service spotbeam regions (e.g., the third gateway 210-3), geographic separation is achieved to allow for re-use of the allocated frequencies.

There are often spare gateway terminals 210 in a given feeder spot beam 225. The spare gateway terminal 210-5 can substitute for the primary gateway terminal 210-4 should the primary gateway terminal 210-4 fail to function properly. Additionally, the spare can be used when the primary is impaired by weather. Referring next to FIG. 8, an embodiment of a downstream channel 800 is shown. The downstream channel 800 includes a series of superframes 804 in succession, where each superframe 804 may have the same size or may vary in size. This embodiment divides a superframe 804 into a number of virtual channels 808(1−n). The virtual channels 808(1−n) in each superframe 804 can be the same size or different sizes. The size of the virtual channels 808(1−n) can change between different superframes 804. Different coding can be optionally used for the various virtual channels 808 (1–n). In some embodiments, the virtual channels are as short as one symbol in duration.

With reference to FIG. 9, an embodiment of an upstream channel 900 is shown. This embodiment uses MF-TDMA, but other embodiments can use CDMA, OFDM, or other access schemes. The upstream channel 900 has 500 MHz of total bandwidth in one embodiment. The total bandwidth is divided into m frequency sub-channels, which may differ in bandwidth, modulation, coding, etc. and may also vary in time based on system needs.

In this embodiment, each subscriber terminal 130 is given a two-dimensional (2D) map to use for its upstream traffic. The 2D map has a number of entries where each indicates a frequency sub-channel 912 and time segment 908(1-5). For example, one subscriber terminal 130 is allocated sub-channel m 912-m, time segment one 908-1; sub-channel two 912-2, time segment two 908-2; sub-channel two 912-2, time segment three 908-3; etc. The 2D map is dynamically adjusted for each subscriber terminal 130 according to anticipated need by a scheduler in the SMTS.

Referring to FIG. 13, an embodiment of a channel diagram is shown. Only the channels for a single feeder spot beam 225 and a single service spot beam 205 are shown, but embodiments include many of each spot beam 225, 205 (e.g., various embodiments could have 60, 80, 100, 120, etc. of each type of spot beam 225, 205). The forward channel 800 includes n virtual channels 808 traveling from the gateway antenna 110 to the service spot beam 205. Each subscriber terminal 130 may be allocated one or more of the virtual channels 808. m MF-TDMA channels 912 make up the return channel 900 between the subscriber terminal (ST) antennas 125 and the feeder spot beam 225.

Referring next to FIG. 3, an embodiment of a ground system 300 of gateways 115 is shown in block diagram form. One embodiment could have fifteen active gateways 115 (and possibly spares) to generate sixty service spot beams, for example. The ground system 300 includes a number of gateways 115 respectively coupled to antennas 110. All the gateways 115 are coupled to a network 120 such as the Internet. The network is used to gather information for the subscriber terminals. Additionally, each SMTS communicates with other SMTS and the Internet using the network 120 or other means not shown.

Each gateway 115 includes a transceiver 305, a SMTS 310 and a router 325. The transceiver 305 includes both a transmitter and a receiver. In this embodiment, the transmitter takes a baseband signal and upconverts and amplifies the baseband signal for transmission of the downstream uplinks 135 with the antenna 110. The receiver downconverts and tunes the upstream downlinks 140 along with other processing as explained below. The SMTS 310 processes signals to allow the subscriber terminals to request and receive information and schedules bandwidth for the forward and return channels 800, 900. Additionally, the SMTS 310 provides configuration information and receives status from the subscriber terminals 130. Any requested or returned information is forwarded via the router 325.

With reference to FIG. 11, an embodiment of gateway receiver 1100 is shown. This embodiment of the receiver 1100 processes four return channels 900 from four different service spot beams 205. The return channels 900 may be divided among four pathways using antenna polarization and/or filtering 1104. Each return channel is coupled to a low-noise amplifier (LNA) 1108. Down conversion 1112 mixes down the signal into its intermediate frequency. Each of the upstream sub-channels 912 is separated from the signal by a number of tuners 1116. Further processing is performed in the SMTS 310.

Referring next to FIG. 10, an embodiment of a gateway transmitter 1000 is shown. The downstream channels 800 are received at their intermediate frequencies from the SMTS 310. With separate pathways, each downstream channel 800 is up-converted 1004 using two different carrier frequencies. A power amplifier 1008 increases the amplitude of the forward channel 900 before coupling to the antenna 110. The antenna 110 polarizes the separate signals to keep the four forward channels 800 distinct as they are passed to the satellite 105. With reference to FIG. 4, an embodiment of a SMTS 310 is shown in block diagram form. Baseband processing is done for the inbound and outbound links 135, 140 by a number of geographically separated gateways 115. Each SMTS 310 is generally divided into two sections, specifically, the downstream portion 305 to send information to the satellite 105 and the upstream portion 315 to receive information from the satellite 105.

The downstream portion 305 takes information from the switching fabric 416 through a number of downstream (DS) blades 412. The DS blades 412 are divided among a number of downstream generators 408. This embodiment includes four downstream generators 408, with one for each of the downstream channels 800. For example, this embodiment uses four separate 500 MHz spectrum ranges having different frequencies and/or polarizations. A four-color modulator 436 has a modulator for each respective DS generator 408. The modulated signals are coupled to the transmitter portion 1000 of the transceiver 305 at an intermediate frequency. Each of the four downstream generators 408 in this embodiment has J virtual DS blades 412.

The upstream portion 315 of the SMTS 310 receives and processes information from the satellite 105 in the baseband intermediate frequency. After the receiver portion 1100 of the transceiver 305 produces all the sub-channels 912 for the four separate baseband upstream signals, each sub-channel 912 is coupled to a different demodulator 428. Some embodiments could include a switch before the demodulators 428 to allow any return link sub-channel 912 to go to any demodulator 428 to allow dynamic reassignment between the four return channels 908. A number of demodulators are dedicated to an upstream (US) blade 424.

The US blades 424 serve to recover the information received from the satellite 105 before providing it to the switching fabric 416. The US scheduler 430 on each US blade 424 serves to schedule use of the return channel 900 for each subscriber terminal 130. Future needs for the subscriber terminals 130 of a particular return channel 900 can be assessed and bandwidth/latency adjusted accordingly in cooperation with the Resource Manager and Load Balancer (RM/LB) block 420.

The RM/LB block 420 assigns traffic among the US and DS blades. By communication with other RM/LB blocks 420 in other SMTSes 310, each RM/LB block 420 can reassign subscriber terminals 130 and channels 800, 900 to other gateways 115. This reassignment can take place for any number of reasons, for example, lack of resources and/or loading concerns. In this embodiment, the decisions are done in a distributed fashion among the RM/LB blocks 420, but other embodiments could have decisions made by one master MR/LB block or at some other central decision-making authority. Reassignment of subscriber terminals 130 could use overlapping service spot beams 205, for example.

Referring next to FIG. 5, an embodiment of a satellite 105 is shown in block diagram form. The satellite 105 in this embodiment communicates with fifteen gateways 115 and all STs 130 using sixty feeder and service spot beams 225, 205. Other embodiments could use more or less gateways/spot beams. Buss power 512 is supplied using a power source such as chemical fuel, nuclear fuel and/or solar energy. A satellite controller 516 is used to maintain attitude and otherwise control the satellite 105. Software updates to the satellite 105 can be uploaded from the gateway 115 and performed by the satellite controller 516.

Information passes in two directions through the satellite 105. A downstream translator 508 receives information from the fifteen gateways 115 for relay to subscriber terminals 130 using sixty service spot beams 205. An upstream translator 504 receives information from the subscriber terminals 130 occupying the sixty spot beam areas and relays that information to the fifteen gateways 115. This embodiment of the satellite can switch carrier frequencies in the downstream or upstream processors 508, 504 in a "bent-pipe" configuration, but other embodiments could do baseband switching between the various forward and return channels 800, 900. The frequencies and polarization for each spot beam 225, 205 could be programmable or preconfigured.

With reference to FIG. 6A, an embodiment of an upstream translator 504 is shown in block diagram form. A Receiver and Downconverter (Rx/DC) block 616 receives all the return link information for the area defined by a spot beam 205 as an analog signal before conversion to an intermediate frequency (IF). There is a Rx/DC block 616 for each service spot beam area 205. An IF switch 612 routes a particular baseband signal from a Rx/DC block 616 to a particular upstream downlink channel. The upstream downlink channel is filled using an Upconverter and Traveling Wave Tube Amplifier (UC/TWTA) block 620. The frequency and/or polarization can be changed through this process such that each upstream channel passes through the satellite 105 in a bent pipe fashion.

Each gateway 115 has four dedicated UC/TWTA blocks 620 in the upstream translator 504. Two of the four dedicated UC/TWTA blocks 620 operate at a first frequency range and two operate at a second frequency range in this embodiment. Additionally, two use right-hand polarization and two use left-hand polarization. Between the two polarizations and two frequencies, the satellite 105 can communicate with each gateway 115 with four separate upstream downlink channels.

Referring next to FIG. 6B, an embodiment of a downstream translator 508 is shown as a block diagram. Each gateway 115 has four downstream uplink channels to the satellite 105 by use of two frequency ranges and two polarizations. A Rx/DC block 636 takes the analog signal and converts the signal to an intermediate frequency. There is a Rx/DC block 636 for all sixty downstream uplink channels from the fifteen gateways 115. The IF switch 612 connects a particular channel 800 from a gateway 115 to a particular service spot beam 205. Each IF signal from the switch 628 is modulated and amplified with a UC/TWTA block 632. An antenna broadcasts the signal using a spot beam to subscriber terminals 130 that occupy the area of the spot beam. Just as with the upstream translator 504, the downstream translator 508 can change carrier frequency and polarization of a particular downstream channel in a bent-pipe fashion.

FIG. 7 comprises a block diagram illustrating a set of subscriber equipment 700 which may be located at a subscriber location for the reception and transmission of communication signals. Components of this set of subscriber equipment 700 may, for example, comprise the antenna 125, associated subscriber terminal 130 and any consumer premises equipment (CPE) 160, which may be a computer, a network, etc.

An antenna 125 may receive signals from a satellite 105. The antenna 125 may comprise a VSAT antenna, or any of a variety other antenna types (e.g., other parabolic antennas, microstrip antennas, or helical antennas). In some embodiments, the antenna 125 may be configured to dynamically modify its configuration to better receive signals at certain frequency ranges or from certain locations. From the antenna 125, the signals are forwarded (perhaps after some form of processing) to the subscriber terminal 130. The subscriber terminal 130 may include a radio frequency (RF) frontend 705, a controller 715, a virtual channel filter 702, a modulator 725, a demodulator 710, a filter 706, a downstream protocol converter 718, an upstream protocol converter 722, a receive (Rx) buffer 712, and a transmit (Tx) buffer 716.

In this embodiment, the RF frontend 705 has both transmit and receive functions. The receive function includes amplification of the received signals (e.g., with a low noise amplifier (LNA)). This amplified signal is then downconverted (e.g., using a mixer to combine it with a signal from a local oscillator (LO)). This downconverted signal may be amplified again with the RF frontend 705, before processing of the superframe 804 with the virtual channel filter 702. A subset of each superframe 804 is culled from the downstream channel 800 by the virtual channel filter 702, for example, one or more virtual channels 808 are filtered off for further processing.

A variety of modulation and coding techniques may be used at the subscriber terminal 130 for signals received from and transmitted to a satellite. In this embodiment, modulation techniques include BPSK, QPSK, 8PSK, 16APSK, 32PSK. In other embodiments, additional modulation techniques may include ASK, FSK, MFSK, and QAM, as well as a variety of analog techniques. The demodulator 710 may demodulate the down-converted signals, forwarding the demodulated virtual channel 808 to a filter 706 to strip out the data intended for the particular subscriber terminal 130 from other information in the virtual channel 808. Once the information destined for the particular subscriber terminal 130 is isolated, a downstream protocol converter 718 translates the protocol used for the satellite link into one that the DOCSIS MAC block 726 uses. Alternative embodiments could use a WiMAX MAC block or a combination DOCSIS/WiMAX block. A Rx buffer 712 is used to convert the high-speed received burst into a lower-speed stream that the DOCSIS MAC block 726 can process. The DOCSIS MAC block 726 is a circuit that receives a DOCSIS stream and manages it for the CPE 160. Tasks such as provisioning, bandwidth management, access control, quality of service, etc. are managed by the DOCSIS MAC block 726. The CPE can often interface with the DOCSIS MAC block 726 using Ethernet, WiFi, USB and/or other standard interfaces. In some embodiments, a WiMax block 726 could be used instead of a DOCSIS MAC block 726 to allow use of the WiMax protocol.

It is also worth noting that while a downstream protocol converter 718 and upstream protocol converter 722 may be used to convert received packets to DOCSIS or WiMax compatible frames for processing by a MAC block 726, these converters will not be necessary in many embodiments. For example, in embodiments where DOCSIS or WiMax based components are not used, the protocol used for the satellite link may also be compatible with the MAC block 726 without such conversions, and the converters 718, 722 may therefore be excluded.

Various functions of the subscriber terminal 130 are managed by the controller 715. The controller 715 may oversee a variety of decoding, interleaving, decryption, and unscrambling techniques, as known in the art. The controller may also manage the functions applicable to the signals and exchange of processed data with one or more CPEs 160. The CPE 160 may comprise one or more user terminals, such as personal computers, laptops, or any other computing devices as known in the art.

The controller 715, along with the other components of the subscriber terminal 130, may be implemented in one or more Application Specific Integrated Circuits (ASICs), or a general purpose processor adapted to perform the applicable functions. Alternatively, the functions of the subscriber terminal 130 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The controller may be programmed to access memory unit (not shown). It may fetch instructions and other data from the memory unit, or write data to the memory-unit. As noted above, data may also be transmitted from the CPE 160 through the subscriber terminal 130 and up to a satellite 105 in various communication signals. The CPE 160, therefore, may transmit data to DOCSIS MAC block 726 for conversion to the DOCSIS protocol before that protocol is translated with an upstream protocol converter 722. The slow-rate data waits in the Tx buffer 716 until it is burst over the satellite link.

The processed data is then transmitted from the Tx buffer 716 to the modulator 725, where it is modulated using one of the techniques described above. In some embodiments, adaptive or variable coding and modulation techniques may be used in these transmissions. Specifically, different modulation and coding combinations, or "modcodes," may be used for different packets, depending on the signal quality metrics from the antenna 125 to the satellite 105. Other factors, such as network and satellite congestion issues, may be factored into the determination, as well. Signal quality information may be received from the satellite or other sources, and various decisions regarding modcode applicability may be made locally at the controller, or remotely. The RF frontend 705 may then amplify and upconvert the modulated signals for transmission through the antenna 125 to the satellite.

What is claimed is:

1. In a two-way satellite communication system having a plurality of upstream channels for communicating information from a plurality of subscriber terminals to a gateway hub and a plurality of virtual downstream channels for communicating information from the gateway to a selection of the subscriber terminals, a method for managing data traffic in the satellite communication system having true random access with more than one transmission present at the same time, the method comprising the steps of:

transmitting information as data on one of the virtual downstream channels in response to information transmitted on at least one of the upstream channels;
 estimating channel load of multiple users in multiple simultaneous access in the upstream channels;
 calculating on an ongoing basis a congestion threshold value using said estimate of channel load;
 selecting a current congestion threshold value; then
 at each said subscriber terminal, performing an experiment comparing the congestion threshold value with a random number to obtain a transmission value determinative of whether a packet is eligible to be transmitted by each said terminal; and
 regulating the transmission of packets in the upstream channels according to said transmission value so that the transmitted load from all said terminals has a rate of packet transmission that is less than the congestion threshold value times the offered load to the terminal, and the virtual downstream channels bear a more evenly distributed load.

2. The method according to claim 1 wherein said estimate of channel load is probability of access and said the congestion threshold value is related to the probability of a globally successful transmission of a number of simultaneously transmitted packets.

3. The method according to claim 2 further including the step of, at each said terminal, throttling the channel load according to a quality of service factor.

4. The method according to claim 3 wherein said congestion threshold is broadcast and said quality of service factor is broadcast at least as frequently as a congestion threshold value.

5. The method according to claim 1 wherein a quality of service factor is committed to each said terminal for use in additionally throttling the channel load and assuring transmission of selected packets.

6. The method according to claim 1 wherein said estimating of channel load is at a hub where traffic of multiple users is monitored.

7. The method according to claim 6 wherein said estimate. of channel load is probability of access and said the congestion threshold value is related to the probability of a globally successful transmission of a number of simultaneously transmitted packets.

8. The method according to claim 6 further including the step of, at each said terminal, throttling the channel load according to a quality of service factor.

9. The method according to claim 8 wherein said congestion threshold is broadcast and said quality of service factor is broadcast at least as frequently as a congestion threshold value.

10. The method according to claim 6 wherein a quality of service factor is committed to each said terminal for use in additionally throttling the channel load and assuring transmission of selected packets.

11. A method for managing data traffic in a multiple-user environment having true random access with more than one transmission present at the same time, the method comprising the steps of:

receiving signals from said multiple users;
 calculating on an ongoing basis a congestion threshold value using an estimate of channel load;
 selecting a current congestion threshold value; then
 at each said terminal, performing an experiment comparing the congestion threshold value with a random number to obtain a transmission value determinative of whether a packet is eligible to be transmitted by each said terminal; and
 transmitting packets through a terminal while throttling the random transmission of packets according to said transmission value so that the transmitted load from all said terminals has a rate of packet transmission that is less than the congestion threshold value times the offered load to the terminal.

12. A method for managing data traffic in a multiple-user environment having true random access with more than one transmission present at the same time, the method comprising the steps of:

receiving signals from said multiple users;
 calculating on an ongoing basis a congestion threshold value using an estimate of channel load;
 selecting a current congestion threshold value; then
 at each said terminal, performing an experiment comparing the congestion threshold value with a random number to obtain a transmission value determinative of whether a packet is eligible to be transmitted by each said terminal;

assigning users of a potentially congested virtual downstream channel to another virtual downstream channel to which the downstream packet streams have been reassigned, and receiving the reassigned packet streams.

13. The method according to claim 12, wherein each virtual downstream channel has a one to one relationship with an upstream channel.

14. The method according to claim 12 wherein each virtual downstream channel has a one to many relationship with affiliated upstream channels.

15. The method according to claim 12 wherein terminals are grouped into upstream channels according to at least one of:

capability, level of service, frequency band, and speed of transmission to effect the creation a group of upstream channels unaffiliated with any downstream channel;

and managing the operation of the terminals.

16. In a two-way satellite communication system, a method for managing data traffic in the satellite system comprising:

providing a multiple user multiple simultaneous access (MUMSA) upstream channel communicatively coupling a plurality of subscriber terminals to a hub through a satellite;

estimating channel load of multiple users having simultaneous access to the MUMSA upstream channel;

calculating on an ongoing basis a congestion threshold value using said estimate of channel load;

selecting a current congestion threshold value and transmitting the current congestion threshold value on a downstream channel to the plurality of subscriber terminals;

at each of the plurality of subscriber terminals, comparing the congestion threshold value with a random number to obtain a transmission value determinative at least in part of whether a packet is eligible to be transmitted by the subscriber terminal; and regulating the transmission of packets in the MUMSA upstream channel according at least in part to the transmission value so that a transmitted load from all of the plurality of terminals has a rate of packet transmission that is less than the congestion threshold value times an offered load to the subscriber terminal, so that the upstream channel bears a more evenly distributed load.

17. The method according to claim 16 further including the step of, at each said terminal, throttling the channel load according to a quality of service factor.

18. The method according to claim 16, wherein the transmission value from the comparing step is determinative of whether packets are transmitted or discarded.

19. The method according to claim 16, the congestion threshold calculating step comprising the repeated steps of:
computing a desired access level (DAL);
establishing an initial value of the congestion threshold;
establishing a channel load via an iterative process;
selecting an adjustment value as a desired access level divided by channel load;
applying hysteresis to the adjustment value so that when the adjustment value is greater than 1, it increments at a rate of diminished slope; thereafter
setting a next congestion threshold to be at the former congestion threshold multiplied by the adjustment value subject to a maximum;
broadcasting the next congestion threshold to subscriber terminals.

20. The method according to claim 19, comprising computing the desired access level based on capacity of the system for possible simultaneous transmissions without degradation and quality requirements based on packet error rates.

21. The method according to claim 19, comprising using the congestion threshold at each subscriber terminal in the network to perform a local portion of the congestion threshold calculating step.

22. An apparatus for managing data traffic in a two-way satellite communication system comprising:

means associated with a plurality of subscriber terminals for providing a multiple user multiple simultaneous access (MUMSA) upstream channel communicatively coupling the plurality of subscriber terminals to a hub through a satellite;

means for estimating channel load of multiple users having simultaneous access to the MUMSA upstream channel;

means for calculating on an ongoing basis a congestion threshold value using said estimate of channel load;

means for selecting a current congestion threshold value and transmitting the current congestion threshold value on a downstream channel to the plurality of subscriber terminals;

means at each of the plurality of subscriber terminals for comparing the congestion threshold value with a random number to obtain a transmission value determinative at least in part of whether a packet is eligible to be transmitted by the subscriber terminal; and means at each of the plurality of subscriber terminals for regulating the transmission of packets in the MUMSA upstream channel according at least in part to the transmission value so that a transmitted load from all of the plurality of terminals has a rate of packet transmission that is less than the congestion threshold value times an offered load to the subscriber terminal, so that the upstream channel bears a more evenly distributed load.

* * * * *